United States Patent
Nobert et al.

(10) Patent No.: US 10,574,173 B2
(45) Date of Patent: Feb. 25, 2020

(54) TECHNIQUES FOR LIMITING ELECTRICAL CURRENT PROVIDED TO A MOTOR IN AN ELECTRIC POWER STEERING SYSTEM

(71) Applicant: Kongsberg Inc., Shawinigan (CA)

(72) Inventors: Ghislain Nobert, Trois-Rivieres (CA); Alexandre Palardy, Shawinigan (CA)

(73) Assignee: Kongsberg Inc., Shawinigan (CA)

( * ) Notice: Subject to any disclaimer, the term of this patent is extended or adjusted under 35 U.S.C. 154(b) by 0 days.

(21) Appl. No.: 16/329,961

(22) PCT Filed: Sep. 1, 2017

(86) PCT No.: PCT/IB2017/055286
§ 371 (c)(1),
(2) Date: Mar. 1, 2019

(87) PCT Pub. No.: WO2018/042389
PCT Pub. Date: Mar. 8, 2018

(65) Prior Publication Data
US 2019/0245475 A1    Aug. 8, 2019

Related U.S. Application Data

(60) Provisional application No. 62/383,306, filed on Sep. 2, 2016.

(51) Int. Cl.
*H02P 29/032* (2016.01)
*H02P 29/60* (2016.01)
(Continued)

(52) U.S. Cl.
CPC ............. *H02P 29/032* (2016.02); *B62D 5/04* (2013.01); *B62D 5/046* (2013.01); *B62D 5/0496* (2013.01); *H02H 7/0833* (2013.01); *H02P 29/60* (2016.02)

(58) Field of Classification Search
CPC .... B62D 5/0496; B62D 5/0481; B62D 5/046; B62D 5/04; H02P 29/032; H02P 29/60; H02P 29/64; H02H 7/0833
See application file for complete search history.

(56) References Cited

U.S. PATENT DOCUMENTS 5,198,736 A    3/1993  Azuma et al.
5,801,504 A    9/1998  Endo et al.
(Continued)

FOREIGN PATENT DOCUMENTS

DE        10115480 A1    3/2002
DE     102012106076 A1    1/2013
(Continued)

OTHER PUBLICATIONS

International Search Report for Application No. PCT/IB2017/055286 dated Dec. 28, 2017, 2 pages.
(Continued)

*Primary Examiner* — Thai T Dinh
(74) *Attorney, Agent, or Firm* — Howard & Howard Attorneys PLLC

(57) ABSTRACT

Techniques for limiting electrical current provided to a motor for an electric power steering system are provided. A first estimated temperature of the motor is determined for a first time step. The first estimated temperature of the motor is filtered to produce a first filtered estimated temperature of the motor. A second estimated temperature of the motor is determined for a second time step subsequent to the first time step. The first filtered estimated temperature is compared with the second estimated temperature to determine whether the motor is heating or cooling. The filter is adjusted in response to determining whether the motor is heating or cooling. The second estimated temperature of the motor is filtered with the adjusted filter to produce a second filtered estimated temperature of the motor. A limit on electrical
(Continued)

current provided to the motor is set using the second filtered estimated temperature.

20 Claims, 14 Drawing Sheets

(51) Int. Cl.
  *B62D 5/04* (2006.01)
  *H02H 7/08* (2006.01)

(56) References Cited

U.S. PATENT DOCUMENTS

| | | | |
|---|---|---|---|
| 5,861,725 A | 1/1999 | Endo et al. | |
| 6,198,241 B1 | 3/2001 | Calamatas | |
| 6,271,637 B1 | 8/2001 | Kushion | |
| 6,326,753 B1 * | 12/2001 | Someya | B62D 5/0463 180/443 |
| 6,380,706 B1 | 4/2002 | Kifuku et al. | |
| 6,911,793 B2 | 6/2005 | Fritsch et al. | |
| 7,071,649 B2 | 7/2006 | Shafer et al. | |
| 7,312,593 B1 | 12/2007 | Streicher et al. | |
| 7,791,296 B2 | 9/2010 | Ogawa | |
| 7,878,512 B2 * | 2/2011 | Horiuchi | B60G 7/006 180/410 |
| 8,019,508 B2 * | 9/2011 | Takeuchi | B62D 5/0496 180/443 |
| 8,196,698 B2 * | 6/2012 | Tamaki | B62D 5/0463 180/444 |
| 8,251,172 B2 * | 8/2012 | Inoue | B62D 5/0496 180/446 |
| 9,893,672 B2 | 2/2018 | Wesenberg et al. | |
| 2002/0179363 A1 | 12/2002 | Takatsuka et al. | |
| 2003/0141835 A1 | 7/2003 | Zheng et al. | |
| 2003/0155879 A1 | 8/2003 | Kifuku et al. | |
| 2004/0007999 A1 | 1/2004 | Kushion et al. | |
| 2004/0026161 A1 | 2/2004 | Takatsuka et al. | |
| 2004/0263105 A1 | 12/2004 | Tsai et al. | |
| 2005/0162113 A1 | 7/2005 | Fujimoto et al. | |
| 2005/0242760 A1 | 11/2005 | Fujita et al. | |
| 2005/0257986 A1 | 11/2005 | Kagei | |
| 2005/0269150 A1 | 12/2005 | Fujimoto et al. | |
| 2006/0245135 A1 | 11/2006 | Lohr | |
| 2007/0247766 A1 | 10/2007 | Zeniya et al. | |
| 2008/0024080 A1 | 1/2008 | Ogawa | |
| 2008/0048591 A1 | 2/2008 | Hamada et al. | |
| 2008/0055799 A1 | 3/2008 | Serizawa et al. | |
| 2008/0088263 A1 | 4/2008 | Lee | |
| 2011/0101904 A1 | 5/2011 | Sakamoto | |
| 2011/0160965 A1 | 6/2011 | Oh | |
| 2011/0178681 A1 | 7/2011 | Gu | |
| 2014/0118866 A1 | 5/2014 | Iwami et al. | |
| 2015/0048772 A1 | 2/2015 | Nagata et al. | |

FOREIGN PATENT DOCUMENTS

| | | | |
|---|---|---|---|
| EP | 0800979 | A2 | 10/1997 |
| EP | 0903279 | A2 | 3/1999 |
| EP | 0943528 | A2 | 9/1999 |
| EP | 1035001 | A2 | 9/2000 |
| EP | 1037356 | A2 | 9/2000 |
| EP | 1040983 | A2 | 10/2000 |
| EP | 1120805 | A2 | 8/2001 |
| EP | 1162126 | A1 | 12/2001 |
| EP | 1219015 | A1 | 7/2002 |
| EP | 1271762 | A2 | 1/2003 |
| EP | 1286456 | A1 | 2/2003 |
| EP | 1376850 | A2 | 1/2004 |
| EP | 1431006 | A2 | 6/2004 |
| EP | 1437271 | A1 | 7/2004 |
| EP | 1477386 | A2 | 11/2004 |
| EP | 1487098 | A1 | 12/2004 |
| EP | 1564881 | A2 | 8/2005 |
| EP | 1595767 | A2 | 11/2005 |
| EP | 1612927 | A1 | 1/2006 |
| EP | 1672324 | A1 | 6/2006 |
| EP | 1719231 | A1 | 11/2006 |
| EP | 1810909 | A1 | 7/2007 |
| EP | 1935753 | A1 | 6/2008 |
| EP | 1997713 | A2 | 12/2008 |
| EP | 2088058 | A2 | 8/2009 |
| EP | 2168842 | A1 | 3/2010 |
| EP | 2234266 | A1 | 9/2010 |
| EP | 2412609 | A1 | 2/2012 |
| EP | 2447133 | A1 | 5/2012 |
| EP | 2774829 | A1 | 9/2014 |
| EP | 2813414 | A1 | 12/2014 |
| EP | 2881305 | A2 | 6/2015 |
| JP | H1111331 | A | 1/1999 |
| JP | H11286278 | A | 10/1999 |
| JP | 2002211425 | A | 7/2002 |
| JP | 2003019973 | A | 1/2003 |
| JP | 2004090676 | A | 3/2004 |
| JP | 2004090683 | A | 3/2004 |
| JP | 2004249913 | A | 9/2004 |
| JP | 2005199899 | A | 7/2005 |
| JP | 2005263010 | A | 9/2005 |
| JP | 2006321411 | A | 11/2006 |
| JP | 2006335263 | A | 12/2006 |
| JP | 2006341795 | A | 12/2006 |
| JP | 2007283916 | A | 11/2007 |
| JP | 2008024196 | A | 2/2008 |
| JP | 2008024242 | A | 2/2008 |
| JP | 2008062916 | A | 3/2008 |
| JP | 2008080967 | A | 4/2008 |
| JP | 2008168669 | A | 7/2008 |
| JP | 2008296696 | A | 12/2008 |
| JP | 2008308050 | A | 12/2008 |
| JP | 2009012662 | A | 1/2009 |
| JP | 2009046006 | A | 3/2009 |
| JP | 2009051255 | A | 3/2009 |
| JP | 2009056849 | A | 3/2009 |
| JP | 2009057047 | A | 3/2009 |
| JP | 2009089531 | A | 4/2009 |
| JP | 2009126240 | A | 6/2009 |
| JP | 2009190663 | A | 8/2009 |
| JP | 2009208760 | A | 9/2009 |
| JP | 2009255685 | A | 11/2009 |
| JP | 2010126081 | A | 6/2010 |
| JP | 2010184551 | A | 8/2010 |
| JP | 2010184685 | A | 8/2010 |
| JP | 2010188932 | A | 9/2010 |
| JP | 2010254006 | A | 11/2010 |
| JP | 2011088517 | A | 5/2011 |
| JP | 2011246035 | A | 12/2011 |
| JP | 2012236472 | A | 12/2012 |
| JP | 2013073957 | A | 4/2013 |
| JP | 2014091373 | A | 5/2014 |
| JP | 2015013498 | A | 1/2015 |
| JP | 2015024754 | A | 2/2015 |
| KR | 20100104655 | A | 9/2010 |
| KR | 20130126017 | A | 11/2013 |
| WO | 0197355 | A1 | 12/2001 |
| WO | 03084797 | A2 | 10/2003 |
| WO | 2004004109 | A2 | 1/2004 |
| WO | 2005074089 | A1 | 8/2005 |
| WO | 2006065337 | A1 | 6/2006 |
| WO | 2012162319 | A1 | 11/2012 |
| WO | 2013087150 | A2 | 6/2013 |

OTHER PUBLICATIONS

Pravallika, J.N. et al., "Optimization of Speed Control of Induction Motor Using Self Tuned PI Plus Fuzzy Hybrid Controller", International Journal of Emerging Technology and Advanced Engineering, vol. 5, Issue No. 1, Jan. 2015, pp. 258-262.

English language abstract for DE 10115480 extracted from espacenet.com database on Sep. 18, 2019, 1 page.

English language abstract for DE 102012106076 extracted from espacenet.com database on Sep. 18, 2019, 1 page.

English language abstract for EP 1431006 extracted from espacenet.com database on Sep. 18, 2019, 1 page.

(56) References Cited

OTHER PUBLICATIONS

English language abstract for JPH 1111331 extracted from espacenet.com database on Sep. 18, 2019, 1 page.
English language abstract for JPH 11286278 extracted from espacenet.com database on Sep. 18, 2019, 1 page.
English language abstract for JP 2002211425 extracted from espacenet.com database on Sep. 18, 2019, 1 page.
English language abstract for JP 2003019973 extracted from espacenet.com database on Sep. 18, 2019, 1 page.
English language abstract for JP 2004090676 extracted from espacenet.com database on Sep. 18, 2019, 1 page.
English language abstract for JP 2004090683 extracted from espacenet.com database on Sep. 18, 2019, 1 page.
English language abstract for JP 2004249913 extracted from espacenet.com database on Sep. 18, 2019, 1 page.
English language abstract for JP 2005199899 extracted from espacenet.com database on Sep. 18, 2019, 1 page.
English language abstract for JP 2005263010 extracted from espacenet.com database on Sep. 18, 2019, 1 page.
English language abstract for JP 2006321411 extracted from espacenet.com database on Sep. 18, 2019, 1 page.
English language abstract for JP 2006335263 extracted from espacenet.com database on Sep. 18, 2019, 1 page.
English language abstract for JP 2006341795 extracted from espacenet.com database on Sep. 18, 2019, 1 page.
English language abstract for JP 2007283916 extracted from espacenet.com database on Sep. 18, 2019, 1 page.
English language abstract for JP 2008024196 extracted from espacenet.com database on Sep. 18, 2019, 1 page.
English language abstract for JP 2008024242 extracted from espacenet.com database on Sep. 18, 2019, 1 page.
English language abstract for JP 2008062916 extracted from espacenet.com database on Sep. 18, 2019, 1 page.
English language abstract for JP 2008080967 extracted from espacenet.com database on Sep. 18, 2019, 1 page.
English language abstract for JP 2008168669 extracted from espacenet.com database on Sep. 18, 2019, 1 page.
English language abstract for JP 2008296696 extracted from espacenet.com database on Sep. 18, 2019, 1 page.
English language abstract for JP 2008308050 extracted from espacenet.com database on Sep. 18, 2019, 1 page.
English language abstract for JP 2009012662 extracted from espacenet.com database on Sep. 18, 2019, 1 page.
English language abstract for JP 2009046006 extracted from espacenet.com database on Sep. 18, 2019, 1 page.
English language abstract for JP 2009051255 extracted from espacenet.com database on Sep. 18, 2019, 1 page.
English language abstract for JP 2009056849 extracted from espacenet.com database on Sep. 18, 2019, 1 page.
English language abstract for JP 2009057047 extracted from espacenet.com database on Sep. 18, 2019, 1 page.
English language abstract for JP 2009089531 extracted from espacenet.com database on Sep. 18, 2019, 1 page.
English language abstract for JP 2009126240 extracted from espacenet.com database on Sep. 18, 2019, 1 page.
English language abstract for JP 2009190663 extracted from espacenet.com database on Sep. 18, 2019, 1 page.
English language abstract for JP 2009208760 extracted from espacenet.com database on Sep. 18, 2019, 1 page.
English language abstract for JP 2009255685 extracted from espacenet.com database on Sep. 18, 2019, 1 page.
English language abstract for JP 2010126081 extracted from espacenet.com database on Sep. 18, 2019, 1 page.
English language abstract for JP 2010184551 extracted from espacenet.com database on Sep. 18, 2019, 1 page.
English language abstract for JP 2010184685 extracted from espacenet.com database on Sep. 18, 2019, 1 page.
English language abstract for JP 2010188932 extracted from espacenet.com database on Sep. 18, 2019, 1 page.
English language abstract for JP 2010254006 extracted from espacenet.com database on Sep. 18, 2019, 1 page.
English language abstract for JP 2011088517 extracted from espacenet.com database on Sep. 18, 2019, 1 page.
English language abstract for JP 2011246035 extracted from espacenet.com database on Sep. 18, 2019, 1 page.
English language abstract for JP 2012236472 extracted from espacenet.com database on Sep. 18, 2019, 1 page.
English language abstract for JP 2013073957 extracted from espacenet.com database on Sep. 18, 2019, 1 page.
English language abstract for JP 2014091373 extracted from espacenet.com database on Sep. 18, 2019, 1 page.
English language abstract for JP 2015013498 extracted from espacenet.com database on Sep. 18, 2019, 1 page.
English language abstract for JP 2015024754 extracted from espacenet.com database on Sep. 18, 2019, 1 page.
English language abstract for KR 20100104655 extracted from espacenet.com database on Sep. 18, 2019, 1 page.
English language abstract for KR 20130126017 extracted from espacenet.com database on Sep. 18, 2019, 1 page.
English language abstract for WO 2013087150 extracted from espacenet.com database on Sep. 18, 2019, 2 pages.

* cited by examiner

TECHNIQUES FOR LIMITING ELECTRICAL CURRENT PROVIDED TO A MOTOR IN AN ELECTRIC POWER STEERING SYSTEM

CROSS-REFERENCE TO RELATED APPLICATIONS

The subject application is the National Stage of International Patent Application No. PCT/IB2017/055286, filed on Sep. 1, 2017, which claims the benefit of U.S. Provisional Patent Application No. 62/383,306, filed on Sep. 2, 2016, the entirety of which is hereby incorporated by reference.

BACKGROUND

1. Field of the Invention

The subject invention relates to systems, methods, and apparatuses relating to electric power steering, and more specifically, systems, methods, and apparatuses for preventing overheating of an electric power steering motor.

2. Description of Related Art

Conventionally, electric power steering systems facilitate the steering of a motor vehicle by augmenting a driver's steering effort through the use of electrical power. These electric power steering systems typically involve a variety of sensors, a controller, and an electric motor. In a general configuration, the driver of the motor vehicle requests an amount of torque from the electric power steering system using a steering wheel. The variety of sensors sense the amount of torque requested by the driver and relays the sensed amount to the controller. The controller then determines a correct amount of electrical current to provide the electric motor in order to properly steer the motor vehicle.

Historically, the electric motor is susceptible to overheating if the driver of the motor vehicle requests a large amount of torque from the electric power steering system. In the event that the driver requests a large amount of torque from the electric power steering system, the controller provides a large amount of electrical current to the electric motor, potentially overheating the electric motor and causing irreparable damage.

While conventional electric power steering systems have offered solutions to prevent an overheating of the electric motor, certain disadvantages remain. For example, there remains a need in the art for electric power steering systems to quickly and accurately detect and resolve the overheating of the electric motor. Furthermore, there remains a need in the art for electric power steering systems to automatically adjust a sensitivity of detecting the overheating of the electric motor. Additionally, as electric motors transition from brushed motors to brushless motors, there remains a need in the art for electric power steering systems to limit electrical current provided to brushless motors.

As such, there are opportunities to address at least the aforementioned problems.

SUMMARY AND ADVANTAGES

One embodiment of an electric power steering unit is provided wherein the electric power steering unit comprises a motor, at least one temperature sensor, at least one current sensor, and a controller coupled to the motor, the at least one temperature sensor, and the at least one current sensor. The controller is configured to receive an ambient temperature measurement from the at least one temperature sensor, receive an electrical current measurement of the motor from the at least one current sensor, estimate temperatures of the motor over time, filter the estimated temperatures of the motor using a filter, adjust the filter based on the estimated temperatures, and limit electrical current provided to the motor over time.

One embodiment of a controller for limiting electrical current provided to a motor of an electric power steering system is provided. The controller is configured to determine a first estimated temperature of the motor, filter the first estimated temperature of the motor with a filter to produce a first filtered estimated temperature of the motor, determine a second estimated temperature of the motor for a second time step, compare the first filtered estimated temperature of the motor with the second estimated temperature of the motor, adjust the filter based on the comparison, filter the second estimated temperature of the motor with the adjusted filter to produce a second filtered estimated temperature of the motor, and set a limit on electrical current provided to the motor using the second filtered estimated temperature of the motor.

One embodiment of a method for limiting electrical current provided to a motor of an electric power steering system is provided. The method comprises the steps of determining a first estimated temperature of the motor, filtering the first estimated temperature of the motor with a filter to produce a first filtered estimated temperature of the motor, determining a second estimated temperature of the motor, comparing the first filtered estimated temperature of the motor with the second estimated temperature of the motor, adjusting the filter based on the comparison, filtering the second estimated temperature of the motor with the adjusted filter to produce a second filtered estimated temperature of the motor, and setting a limit on electrical current provided to the motor using the second filtered estimated temperature of the motor.

One embodiment of a controller for limiting electrical current provided to a motor of an electric power steering system is provided. The controller is configured to estimate temperatures of the motor over time, filter the estimated temperatures of the motor using a filter, adjust the filter based on the estimated temperatures, and limit electrical current provided to the motor over time based on the adjusted filter.

One embodiment of a method for limiting electrical current provided to a motor of an electric power steering system is provided. The method comprises the steps of estimating temperatures of the motor over time, filtering the estimated temperatures of the motor using a filter, adjusting the filter based on the estimated temperatures; and limiting electrical current provided to the motor over time based on the adjusted filter.

One embodiment of a controller for limiting electrical current provided to a motor for an electric power steering system is provided. The controller comprises a motor temperature estimating portion. The motor temperature estimating portion comprises a first input being configured to receive an ambient temperature measurement relating to the motor, a second input being configured to receive an electrical current measurement of the motor, a first combiner coupled to the first input and the second input and being configured to combine the ambient temperature measurement and the electrical current measurement, a temperature filtering portion comprising a filter and being configured to receive and to filter the estimated temperature of the motor, and a first output coupled to the temperature filtering portion and being configured to output a filtered estimated temperature of the motor. The motor current control portion is coupled to the motor temperature estimating portion and is configured to limit electrical current provided to the motor in response to the filtered estimated temperature of the motor.

The system, methods, and apparatuses advantageously provide improved detection and resolution of an overheating of the electric motor. By filtering estimated temperatures of the motor over time, the controller is able to accurately determine a temperature of the motor. In this way, the electric power steering unit can quickly detect an overheating of the electric motor and begin limiting electrical current provided to the motor. Furthermore, because the controller comprises an adjustable filter, the electric power steering unit is able to adjust a sensitivity of detecting an overheating of the electric motor. Additionally, the electric power steering unit can be configured to function with a brushed motors or brushless motors.

Of course, the systems, methods, and apparatuses, as described herein may exhibit or provide advantages other than those described above. The advantages described above are not intended to limit the scope of the claimed invention.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Referring to the Figures, wherein like numerals indicate like or corresponding parts throughout the several views, an electric power steering unit for limiting electrical current provided to a motor is provided.

I. Electric Power Steering Unit Overview

Figure 1:
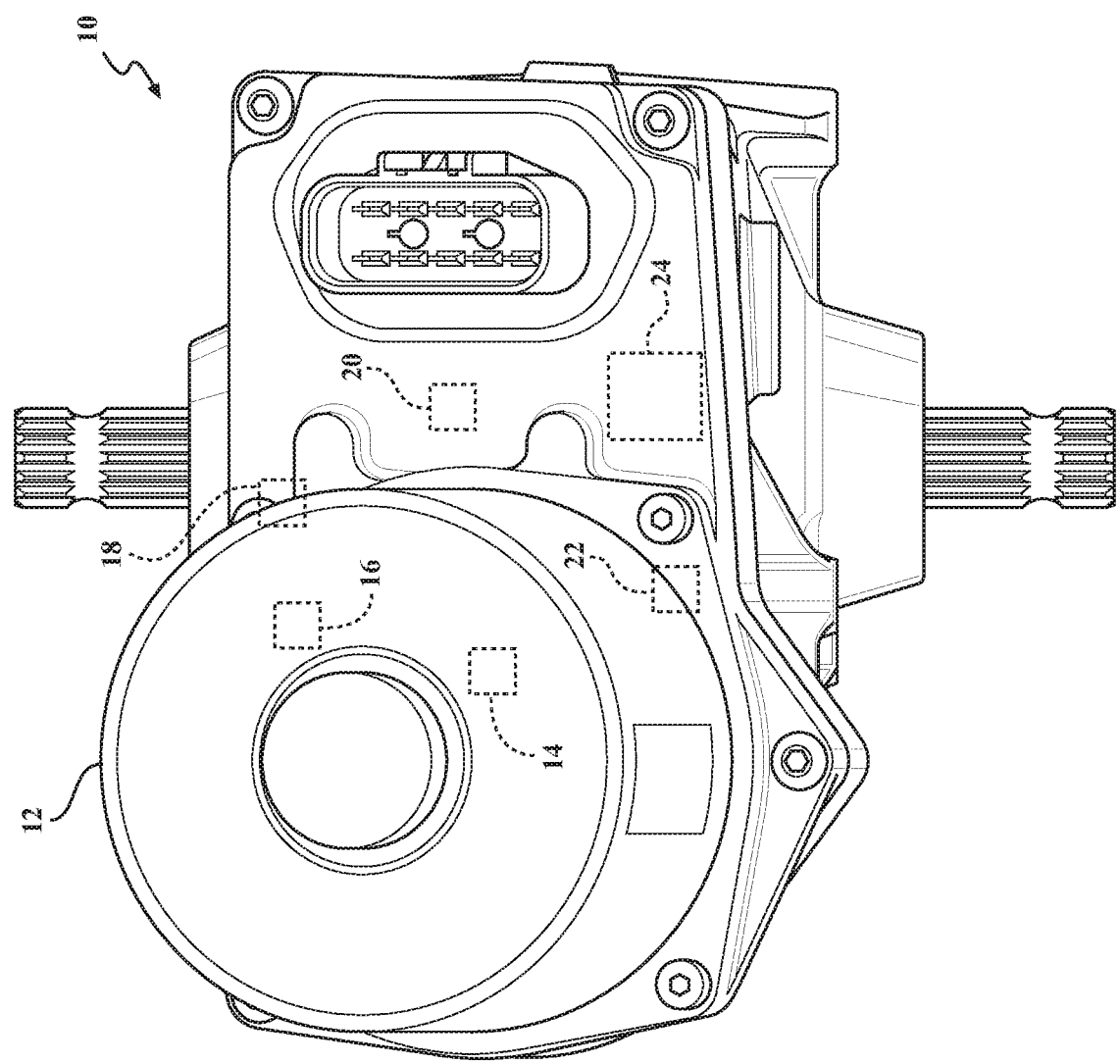
FIG. 1 is a perspective view of an electric power steering unit including a motor, temperature sensors, current sensors, and a controller for limiting electrical current provided to the motor.

FIG. 1 illustrates one embodiment of an electric power steering unit 10. The electric power steering unit 10 includes a motor 12, at least one temperature sensor 20, 22, at least one current sensor 16, 18, and a controller 24. The controller 24 is coupled to the motor 12, the at least one temperature sensor 20, 22, and the at least one current sensor 16, 18. The at least one temperature sensor 20, 22 senses an ambient temperature relating to the motor 12. The at least one current sensor 16, 18 senses an electrical current of the motor 12.

In the embodiment of the electrical power steering unit 10 shown in FIG. 1, the electric power steering unit 10 includes two temperature sensors 20, 22, two current sensors 16, 18, as well as a motor position sensor 14. However, it is to be appreciated that in various embodiments of the electrical power steering unit 10, the electrical power steering unit 10 may include a varying number of temperature and current sensors. Furthermore, it is to be appreciated that, in other embodiments, the electrical power steering unit 10 may include a varying number of motor position sensors 14 or may not include a motor position sensor 14. Additionally, above described components of the electrical power steering nit 10 may be positioned at any suitable position on the electrical power steering unit 10.

II. Closed-Loop Control in Brushed and Brushless Motor Embodiments

The electric power steering unit 10 controls the motor 12 to output a desired amount of torque. To accomplish this, the electric power steering unit 10 receives a current value, which corresponds to the desired amount of torque. The electric power steering unit 10 then uses closed-loop control to control the motor 12 based on the received current value.

In some embodiments, the motor 12 in FIG. 1 may be a brushed motor or a brushless motor. As such, the electric power steering unit 10 may exercise various methods closed-loop control to properly control the motor 12. To explain, in both embodiments, a torque controller 26 provides a target electrical current, labeled "Iref" in FIG. 15 and "Iq" in FIG. 16, which corresponds to the desired amount of torque. The controller 24 then receives the Iref value and, depending on whether the motor 12 is a brushed motor or a brushless motor, proceeds to control the motor 12 using various methods.

Figure 15:
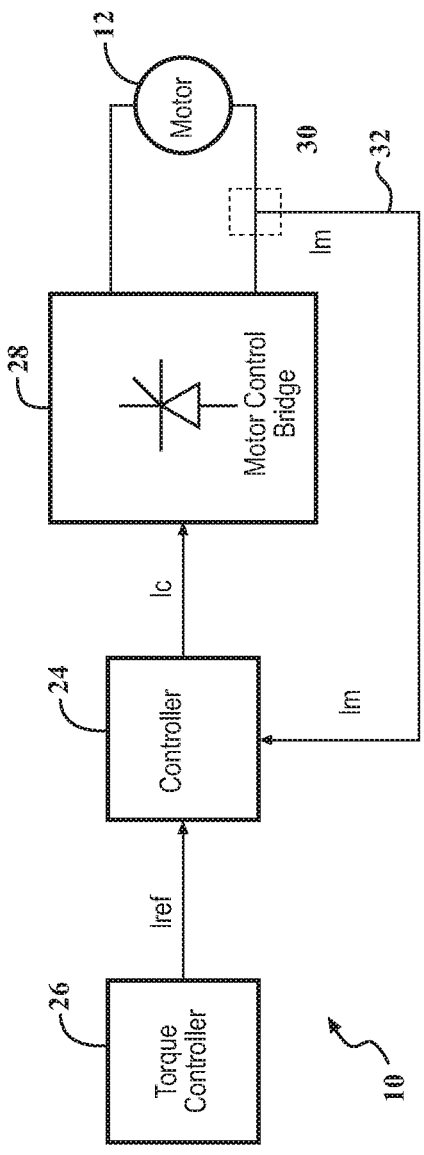
FIG. 15 is a schematic view of the electric power steering unit wherein the motor is a brushed motor.

In an embodiment shown in FIG. 15, the motor 12 is a brushed motor 12. Here, the electric power steering unit 10 attempts to control the motor 12 such that the electrical current of the motor, labeled "Im" is equivalent to Iref. As previously stated, the controller 24 receives Iref from the torque controller 26. The controller 24 then calculates a corresponding electrical current, labeled "Ic", and provides Ic to the motor control bridge 24, which drives the motor 12 accordingly. A current sensor 30 senses and transmits Im to the controller 24 using a feedback loop 32. The controller 24 then compares Im and Iref to calculate future Ic values.

Figure 16:
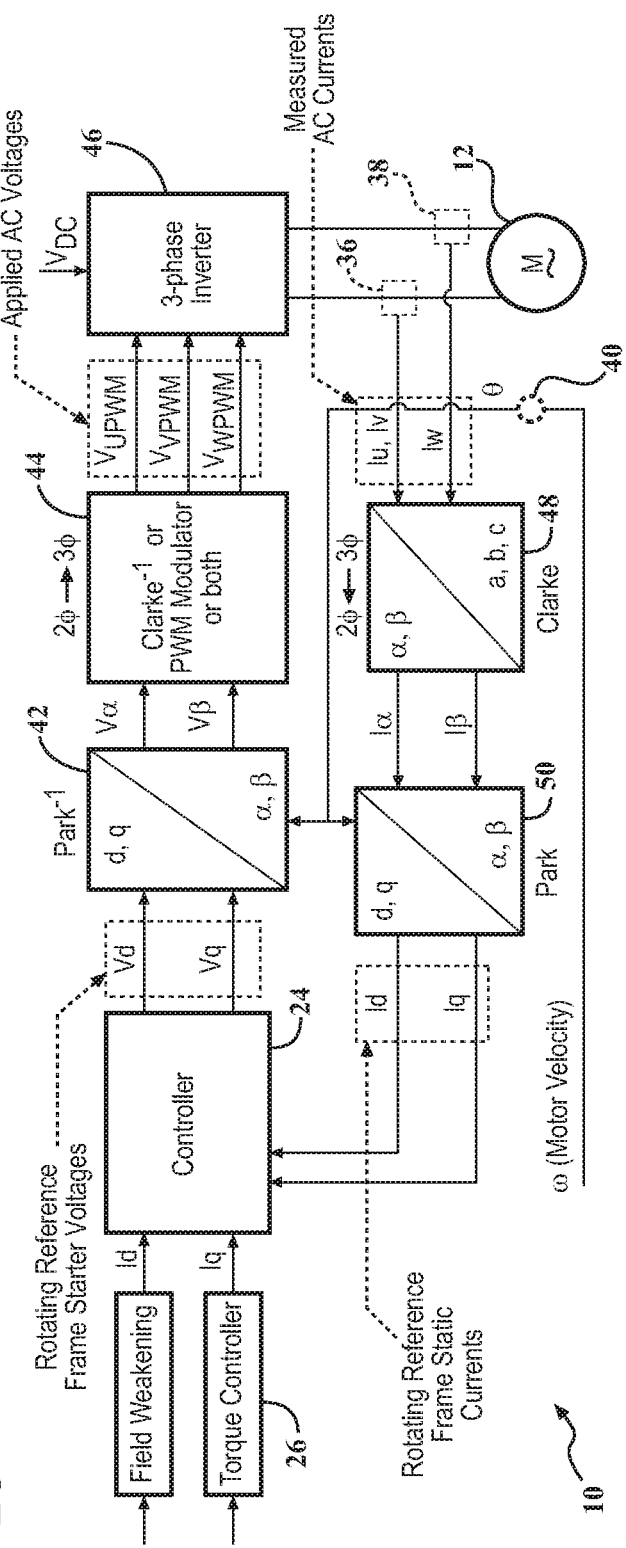
FIG. 16 is a schematic view of the electric power steering unit wherein the motor is a brushless motor.

In another embodiment of the electric power steering unit 10, as shown in FIG. 16, the motor 12 is a brushless motor 12. In this embodiment, the electric power steering unit 10 again attempts to provide the motor 12 with an amount of electrical current equivalent to a target electrical current provided by a torque controller 34. As previously stated, the controller 24 receives the target electrical current, labeled "Iq", from the torque controller 26 and controls the motor 12 accordingly. In this embodiment, the target electrical current, Iq, refers to a quadrature electrical current component, which is a component of the electrical current of the motor 12 that is directly proportional to a torque outputted by the motor 12. The controller 24 then calculates a corresponding quadrature voltage, labeled "Vq", to drive the motor 12 according to Iq. The controller 24 also receives, via a feedback loop, a sensed Iq value from the motor 12 for calculating future Vq values.

In contrast to the electric power steering unit 10 shown in FIG. 15, the electric power steering unit 10 shown in FIG. 16 includes a variety of vector trigonometric transformation blocks for transforming an output of the controller 24 and a feedback signal to the controller 24. These vector trigonometric transformation blocks include a Park block 50, a Park-1 block 42, a Clarke block 48, and a Clarke-1 block 44. Furthermore, the electric power steering unit 10 includes a rotor position sensor 40, which provides a rotor angle, labeled "θ", for use by the Park block 50, and the Park-1 block 42. Additionally, the electric power steering unit 10 includes a 3-phase inverter 46, which converts DC voltages and DC currents to AC currents for controlling the motor 12.

Furthermore, it should be noted that the controller 24 in FIG. 16 also receives a direct electrical current component, labeled "Id", and calculates a corresponding direct voltage, labeled "Vd". Id is a component of the electrical current of the motor 12 just as Iq is a component of the electrical current of the motor 12. But unlike Iq, Id is not responsible for providing torque. As shown in FIG. 16, Id may result from a phenomenon known in the art as field weakening. The controller 24 may also receive, via the feedback loop, a sensed Id value from the motor 12. The sensed Id value may be calculated using three motor lead sensed electrical currents, labeled "Iu", "Iv" and "Iw".

In some embodiments, Iu, Iv, and Iw, may be sensed using three current sensors, however, in the embodiment shown in FIG. 16, Iu, Iv, and Iw, are sensed using only two current sensors 36, 38. By applying Kirchoff's Law to the three electrical currents, it may be noted that Iu+Iv+Iw=0. Therefore, if two of the three motor lead sensed electrical currents are known, the third may be easily determined. As a result, the three motor lead sensed electrical currents may be sensed using only two current sensors 36, 38.

III. Controller Configuration

The controller 24 is configured to limit electrical current provided to the motor 12 to prevent an overheating of the motor 12. Generally speaking, the controller 24 accomplishes this task by estimating temperatures of the motor 12 and limiting the electrical current provided accordingly.

In the embodiment of the electric power steering unit 10 with the brushed motor shown in FIG. 15, the controller 24 may estimate the temperature of the motor 12 using the measured electrical current of the motor 12, Im. The controller 24 may then limit the electrical current provided to the motor 12 by limiting the calculated electrical current, Ic, based on the estimated temperature of the motor 12.

In the embodiment of the electric power steering unit 10 with the brushless motor 12, shown in FIG. 16, the controller 24 may estimate the temperature of the motor 12 using the direct electrical current component, Id, and the quadrature electrical current component, Iq. More explicitly stated, the controller 24 combines the two current components, Id and Iq, to form a representative electrical current, which may be used to estimate the temperature of the motor 12. The representative electrical current, referred to as "$I_{meas}$" below, may be expressed using an equation:

$$I_{meas} = \sqrt{I_q^2 + I_d^2}$$

The controller 24 may then limit the electrical current provided to the motor 12 by limiting the Iq provided to the motor 12. The controller 24 accomplishes this by limiting the calculated quadrature voltage, Vq, based on the estimated temperature of the motor 12.

Figure 2:
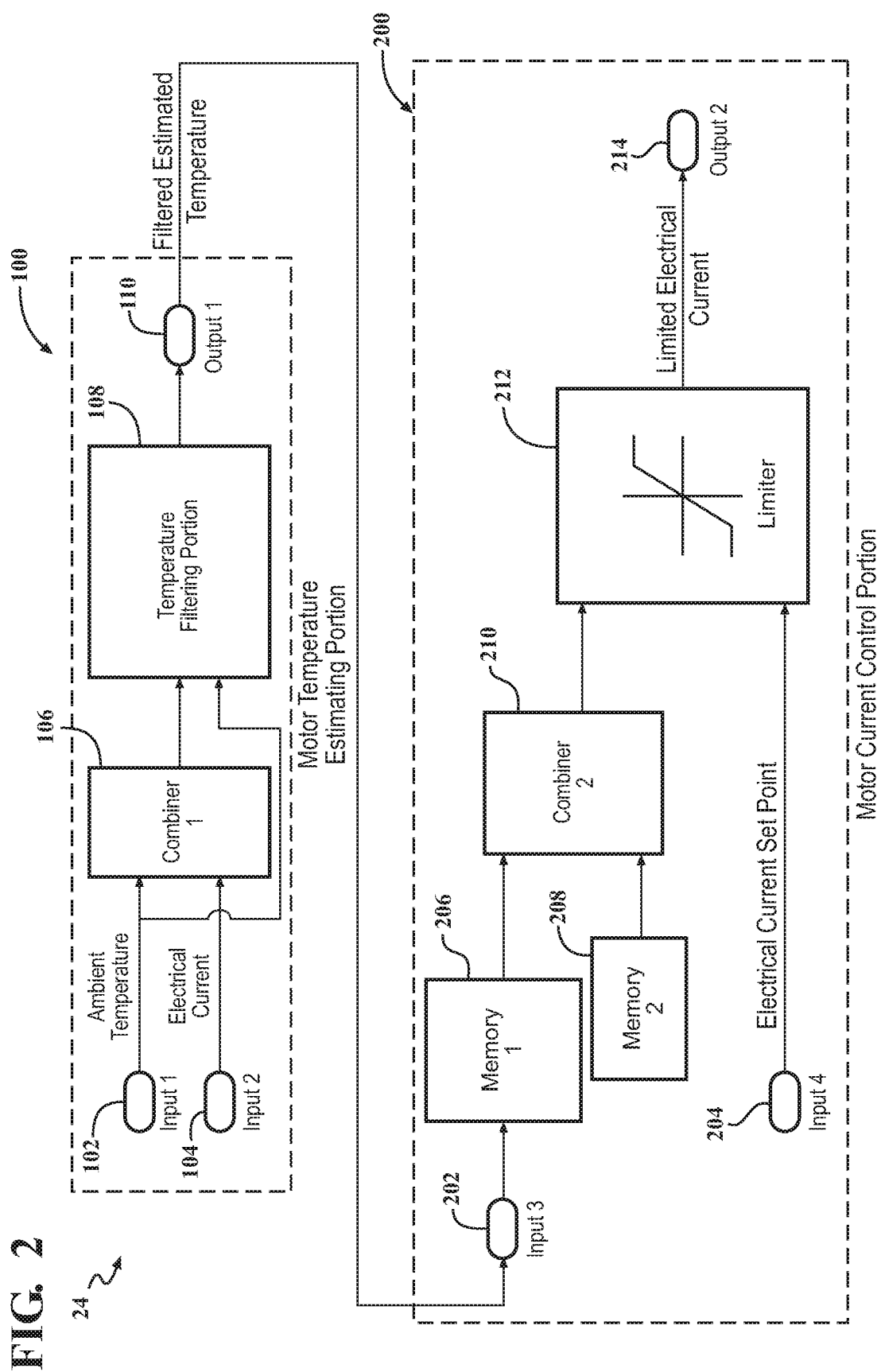
FIG. 2 is a schematic view of the controller wherein the controller includes a motor temperature estimating portion and a motor current control portion, according to one embodiment.

As shown in FIG. 2, the controller 24 uses a motor temperature estimating portion 100 to estimate the temperature of the motor 12 and a motor current control portion 200 to control the electrical current provided to the motor 12.

Figure 3:
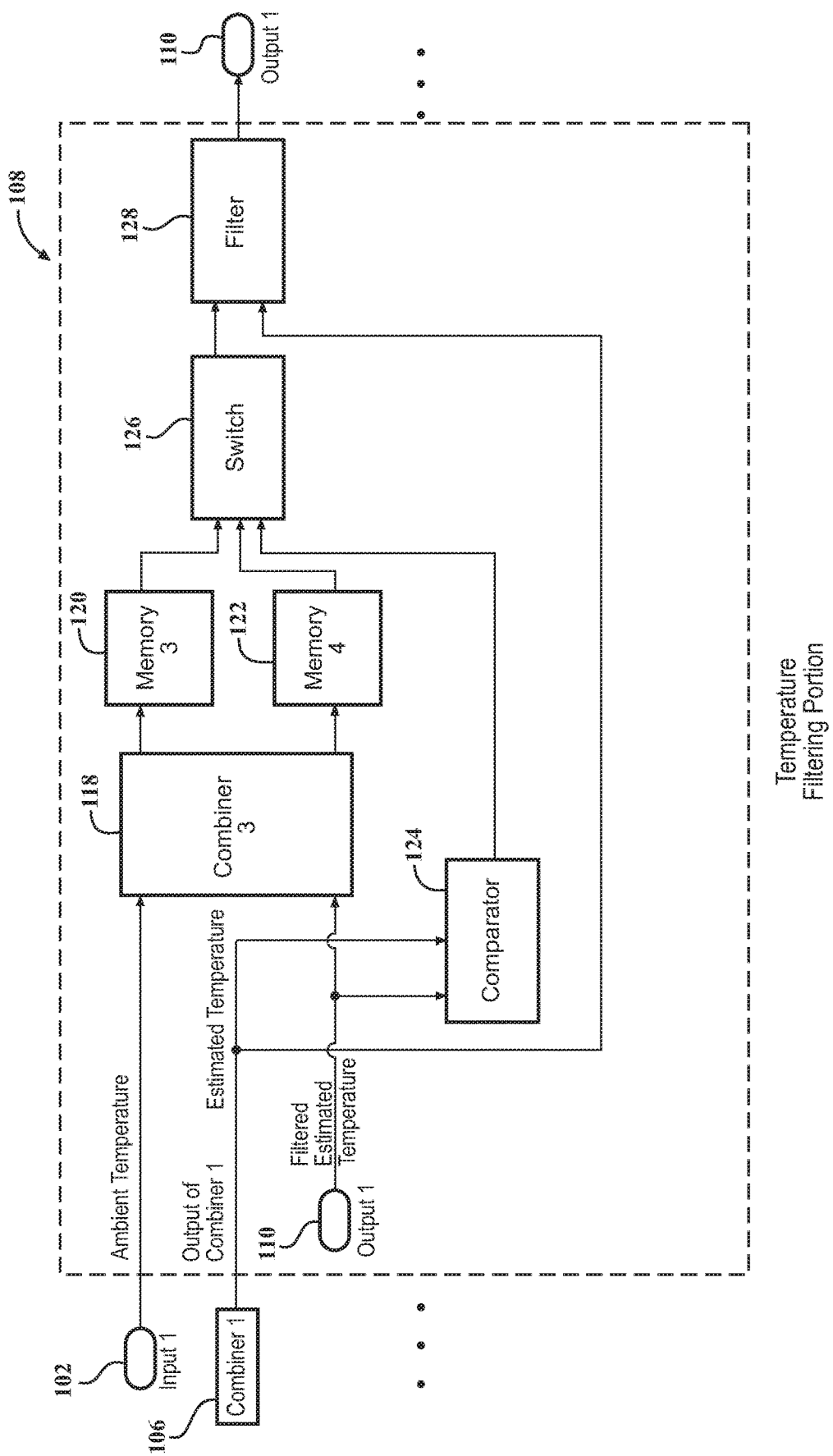
FIG. 3 is a partial schematic view of the controller illustrating a temperature filtering portion, according to one embodiment.

The motor temperature estimating portion 100 includes a first input 102, which receives the ambient temperature measurement from the at least one temperature sensor 20, 22. The motor temperature estimation portion also includes a second input 104, which receives the electrical current measurement from the at least one current sensor 16, 18. A first combiner 106 is coupled to the first input 102 and to the second input 104. The first combiner 106 combines the ambient temperature measurement and the electrical current measurement to determine an estimated temperature of the motor 12. It is to be appreciated that any combiner used by the controller 24 may combine inputs to the combiner using a variety of mathematical operations. The motor temperature estimating portion 100 also includes a temperature filtering portion 108, which filters the estimated temperature of the motor 12 using a filter 128 (as shown in FIG. 3) to produce a filtered estimated temperature of the motor 12. Furthermore, the motor temperature estimating portion 100 includes a first output 110, which is coupled to the temperature filtering portion 108 and outputs the filtered estimated temperature of the motor 12.

As previously stated, the temperature filtering portion 108 receives and filters the estimated temperature of the motor 12. As shown in FIG. 3, the temperature filtering portion 108 is coupled to the first input 102 and to the first combiner 106 and receives the ambient temperature measurement as well as the estimated temperature of the motor 12. The temperature filtering portion 108 also includes a comparator 124, coupled to the first combiner 106 and to the first output 110. In one embodiment, the comparator 124 receives the filtered estimated temperature through the use of a feedback loop. As follows, the first output is sent back to the comparator 124 as an input. The comparator 124 compares the filtered estimated temperature of the motor 12 and the estimated temperature of the motor 12 to determine if the motor 12 is heating or cooling.

Furthermore, the temperature filtering portion 108 includes a combiner, referred to as a third combiner 118. In one embodiment, the third combiner 118, like the comparator 124, receives the filtered estimated temperature through the use of a feedback loop. The third combiner 118 combines the ambient temperature measurement and the filtered estimated temperature of the motor 12. In some embodiments, the third combiner 118 combines the ambient temperature measurement and the filtered estimated temperature of the motor 12 to determine a difference in temperature.

Two memories 120, 122 are coupled to the third combiner 118. These memories 120, 122, referred to as a third memory 120 and a fourth memory 122, each associate a smoothing factor of the filter 128 with an output of the third combiner 118. The smoothing factor of the filter is a parameter between 0 and 1 that determines the sensitivity of the filter 128.

A switch 126 is coupled to the comparator 124, the third memory 120, and the fourth memory 122. The switch 126 receives the two smoothing factors, one from the third memory 120 and one from the fourth memory 122, and outputs one of the smoothing factors in response to whether the motor 12 is heating or cooling, which is determined by the comparator 124.

Coupled to the switch 126 and the first combiner 106 is the filter 128. The filter 128 receives the smoothing factor from the switch 126 and filters the estimated temperature of the motor 12 received from the first combiner 106, accordingly. The filter outputs the filtered estimated temperature of the motor 12 to the first output.

As previously stated, the controller 24 also includes the motor current control portion 200. The motor current control portion 200 limits the electrical current provided to the motor 12 in response to the filtered estimated temperature of the motor 12. As shown in FIG. 2, the motor current control portion 200 includes a third input 202, as well as a as a first memory 206. The third input 202 is coupled to the first output 110 and receives the filtered estimated temperature of the motor 12. The first memory 206, which is coupled to the third input 202, receives and associates the filtered estimated temperature of the motor 12 with an electrical current limiting factor. In an embodiment, the electrical current limiting factor is a value between 0 and 1, inclusive, where the closer the electrical limiting factor is to 1, the less the controller 24 limits the electrical current provided to the motor 12.

The motor current control portion 200 also includes a second memory 208. The second memory 208 stores a preset maximum electrical current allowed to the motor 12. In one embodiment, this preset maximum electrical current represents an electrical current that, if provided to the motor 12, will not cause damage to the motor 12. However, if, in such an embodiment, the preset maximum electrical current is exceeded, damage to the motor 12 may follow.

A second combiner 210, is coupled to the second memory 208 and to the first memory 206. The second combiner 210 combines outputs of the second memory 208 and the first memory 206. More specifically, the second combiner 210 applies the electrical current limiting factor to the preset maximum electrical current. In some embodiments, the second combiner 210 multiplies the current limiting factor and the preset maximum electrical current, outputting an upper bound for electrical current to be provided to the motor 12.

A limiter 212, is coupled to the second combiner 210 and to a fourth input 204. The fourth input 204 receives an electrical current set point for controlling the motor 12. In some embodiments, the electrical current set point comes from a different controller. For example, the electrical current set point may be determined by a controller, which may sense an electrical current demanded by the user. For example, in the embodiment of electric power steering unit 10 shown in FIG. 15, the electrical current set point may be Iref, which is provided by the torque controller 24. In the embodiment shown in FIG. 16, the electrical current set point may be Iq, which is provided by the torque controller 24. The limiter 212 receives and limits the electrical set point using an output of the second combiner 210. The limiter 212 outputs a limited electrical current value. A second output 214 is coupled to the limiter 212 and provides the limited electrical current value to the motor 12.

Figure 4:
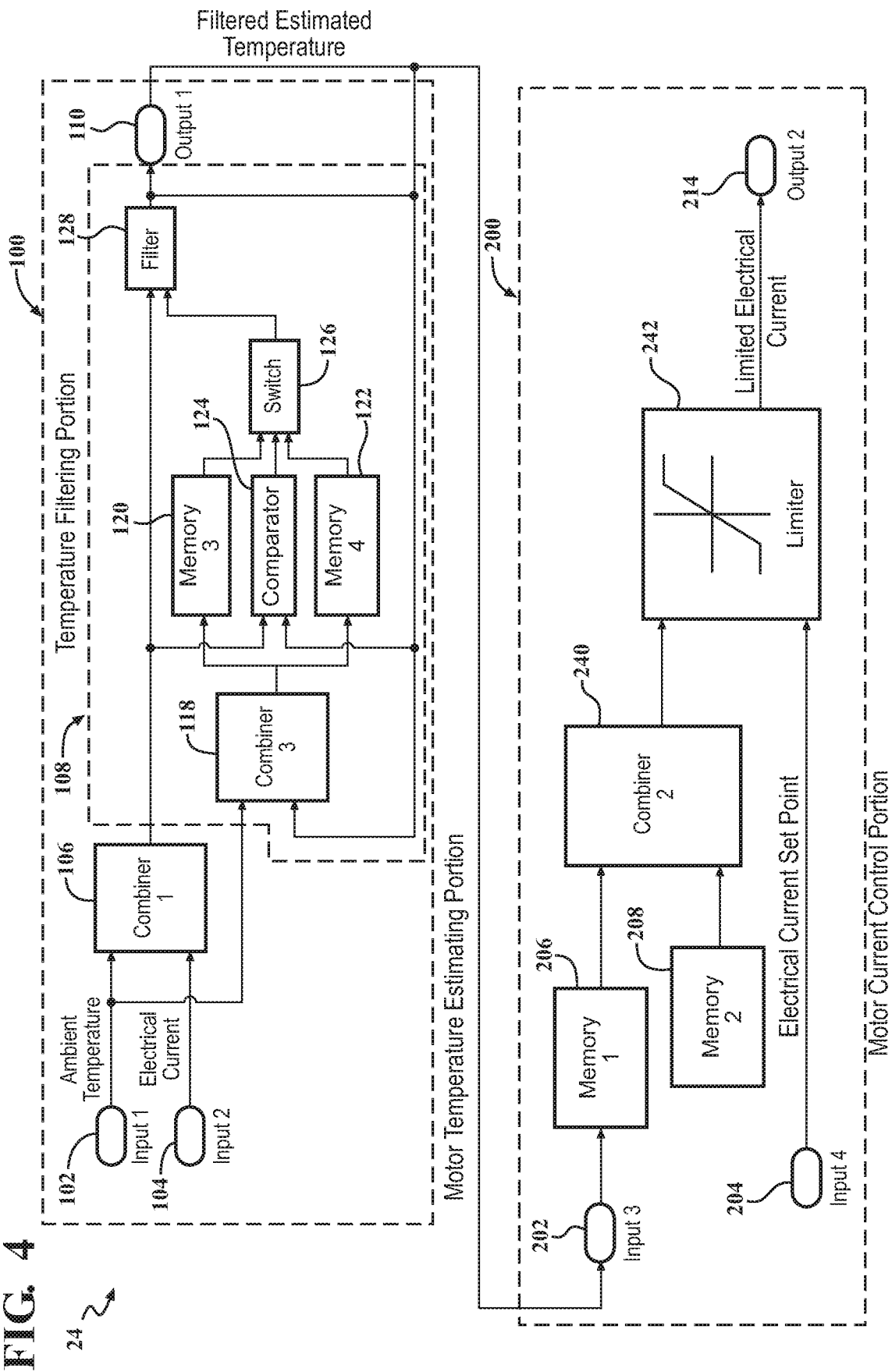
FIG. 4 is a schematic view of the controller representing a combined view of FIGS. 2 and 3, according to one embodiment.

For purposes of illustration, FIG. 4 demonstrates a combined view of FIGS. 2 and 3, according to one embodiment. Here, the temperature filtering portion 108 is included in its entirety along with the motor temperature estimating portion 100 and the motor current control portion 200.

IV. Graphical Programming Environment Embodiment

In accordance with the components described above, FIG. 5 is a schematic view of the controller 24 as it may be implemented in a graphical programming environment, according to one embodiment. The embodiment of the controller 24 shown in FIG. 5 may be implemented using Simulink, a graphical programming environment developed by MathWorks. As such, FIG. 5 may include various Simulink specific blocks chosen to operationally replicate the previously discussed components of the controller 24 (shown in FIGS. 2-4). However, it is to be appreciated that these various Simulink specific blocks may be substituted for other Simulink specific blocks if the operation of the previously discussed components of the controller 24 are not compromised. Furthermore, the controller 24 may be implemented in a variety of programming environments, graphical or not.

Figure 5:
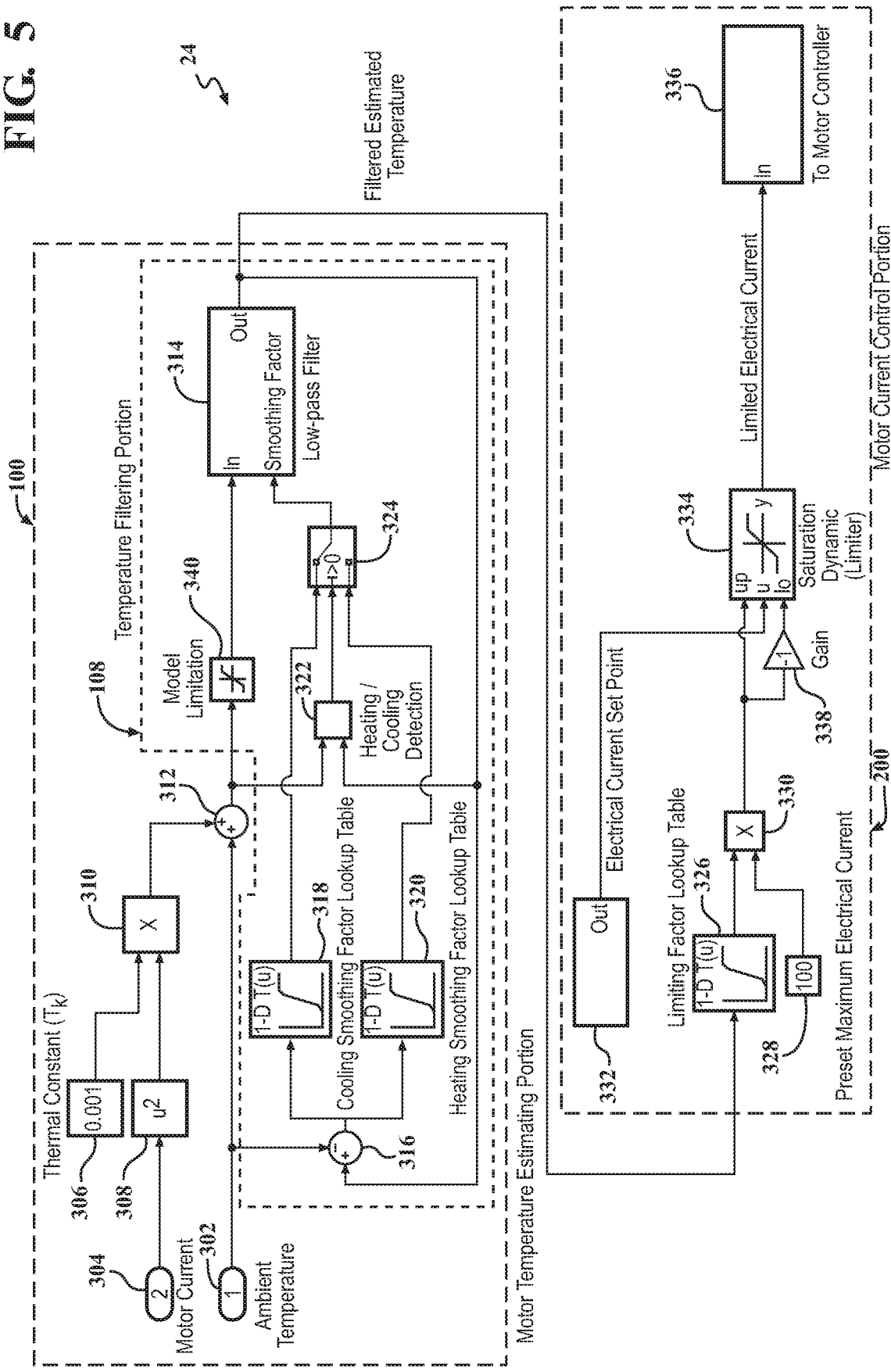
FIG. 5 is a schematic view of the controller for limiting electrical current provided to a motor for an electric power steering system as it may be implemented in a graphical programming environment, according to one embodiment.

As shown in FIG. 5, the first input 102 and the second input 104 of the motor temperature estimating portion 100 may be implemented using two input blocks, referred to as a first input block 302 and a second input block 304. The first input block 302 receives the ambient temperature measurement relating to the motor 12 and the second input block 304 receives the electrical current measurement of the motor 12.

Also shown in FIG. 5, the first combiner 106 of the motor temperature estimating portion 100 may be implemented using a constant block 306 labeled "Thermal Constant (Tk)", a power 2 block 308, a product block 310, and an adder block 312. The combiner 106 uses these blocks to receive and combine the ambient temperature measurement and the electrical current measurement to determine the estimated temperature of the motor 12. It is to be appreciated that the combiner 106, in various embodiments of the controller 24, may be implemented differently.

As shown, the motor temperature estimating portion 100 also includes the temperature filtering portion 108. The temperature filtering portion 108 is coupled the first input block 302 to receive the ambient temperature measurement and to the output of the adder block 312 to receive estimated temperature of the motor 12.

As shown in FIG. 5, the filter 128 of the temperature filtering portion 108 is implemented using a low-pass filter 314. It is to be appreciated that, in various embodiments of the controller 24, the filter 128 may be implemented using a variety of filters. For example, the filter 128 may, include analog or digital filters, passive or active filters, a high-pass filter, a low-pass filter, a band-pass filter, a band-stop filter, or combinations thereof. In this specific embodiment, a low-pass filter was chosen to satisfy the needs of the controller 24.

The third combiner 118 of the temperature filtering portion 108 is implemented using a subtractor block 316 coupled to the first input block 302 and the output of the motor temperature estimating portion 100, with the output of the motor temperature estimating portion 100 being the filtered estimated temperature of the motor 12. The third memory 120 and the fourth memory 122 are implemented using one-dimensional (1-D) lookup tables, referred to as a cooling smoothing factor lookup table 318 and a heating smoothing factor lookup table 320. The cooling smoothing factor lookup table 318 and the heating smoothing factor lookup table 320 each associate a smoothing factor of a filter with an output of the subtractor block 316. The lookup tables 318, 320 then output the smoothing factors.

The comparator 124 of the temperature filtering portion 108 is implemented using a logical operator block 322, labeled "Heating/Cooling Detection" in FIG. 5. The logical operator block 322 is coupled to the output of the motor temperature estimating portion 100 and the output of the adder block 312. The logical operator block 322 compares the filtered estimated temperature of the motor 12 and the estimated temperature of the motor 12 to determine if the motor 12 is heating or cooling.

The switch 126 of the temperature filtering portion 108 is implemented using a switch block 324. The switch block 324 is coupled to the output of the cooling smoothing factor lookup table 318, the output of the heating smoothing factor lookup table 320, and the output of the logical operator block 320. Therefore, depending on if the motor 12 is heating or cooling, the switch block 314 outputs the smoothing factor received from the heating smoothing factor lookup table 320 or from the cooling smoothing factor lookup table 318.

Previously introduced, the low-pass filter 314 is coupled to the output of the switch block 324 and the estimated temperature of the motor 12. The low-pass filter 314 accepts the smoothing factor from the switch block 324, and is able to filter the estimated temperature of the motor 12 to output the filtered estimated temperature of the motor 12.

It is to be noted that, some Simulink blocks shown in FIG. 5 are not described in FIGS. 2-4. For example, in the embodiment of the controller 24 shown in FIG. 5, a model limitation block 340 is optionally included in the temperature filtering portion 108. The model limitation block 340 is coupled to the output of the adder 312 and receives the estimated temperature of the motor 12. The model limitation block 340 keeps the estimated temperature of the motor 12 within a realistic temperature margin. In the event that the estimated temperature value received by the model limitation block 340 is outside the realistic temperature margin, due to various types of error, the model limitation block will set the estimated temperature of the motor 12 to a forced temperature value that falls within the realistic temperature margin. Depending on an embodiment of the controller 24, the realistic temperature margin and the forced temperature value are both subject to change.

It is to be further noted that, in the embodiment shown in FIG. 5, the first output 110 and the third input 202 are not specifically implemented as a part of the motor temperature estimating portion 100 and the motor current control portion 200, respectively. In this embodiment, the output of the motor temperature estimating portion 100, and by equivalence, the output of the temperature filtering portion 108, may be directly connected to the motor current control portion 200. It is to be appreciated, however, that in various embodiments of the controller 24, the first output 110 and the third input 202 may be implemented as suggested by FIGS. 2-4.

FIG. 5 also illustrates the motor current control portion 200. The first memory 206 of the motor current control portion 200 is implemented using a 1-D lookup table, referred to as a limiting factor lookup table 326. The limiting factor lookup table 326 associates the filtered estimated temperature of the motor 12 with the electrical current limiting factor.

The second memory 208 of the motor current control portion 200 is implemented as a constant block 328. The constant block 328 stores the preset maximum electrical current allowed to the motor 12. In the embodiment shown in FIG. 5, the preset maximum electrical current allowed to the motor 12 is set to 100 Amps. It is to be appreciated that, in various embodiments of controller 24, the preset maximum electrical current allowed to the motor 12 may be set to a different electrical current value.

The second combiner 210 of the motor current control portion 200 is implemented using a product block 330. In the embodiment illustrated by FIG. 5, the product block 330 multiplies the current limiting factor and the preset maximum electrical current.

The fourth input 204 of the motor current control portion 200 is implemented using a from workspace block 332. The from workspace block 332 receives the electrical current set point from a Simulink workspace.

The limiter 212 of the motor current control portion 200 is implemented using a saturation dynamic block 334, which is coupled to the product block 330 and to the from workspace block 332. In the embodiment shown in FIG. 5, the saturation dynamic block 334 requires three inputs an upper bound value, a signal to be limited, and a lower bound value. Here, the output of the product block 330, which is the product of the electrical current limiting factor and the preset maximum electrical current allowed to the motor 12, serves as the upper bound value. Furthermore, a gain block 338 with a gain of −1, is used to set the lower bound value as an additive inverse of the upper bound value. Finally, the saturation dynamic block 334 receives the electrical current set point from the from workspace block 332 and uses the electrical current set point as the signal to be limited. In this way, the saturation dynamic block 334 is able to limit the electrical current set point to output the limited electrical current.

The second output 214 of the motor current control portion 200 is implemented using a to workspace block 336. The to workspace block 336 outputs the limited electrical current to a Simulink workspace and is used to control the motor 12.

V. Method Overview

Figure 6:
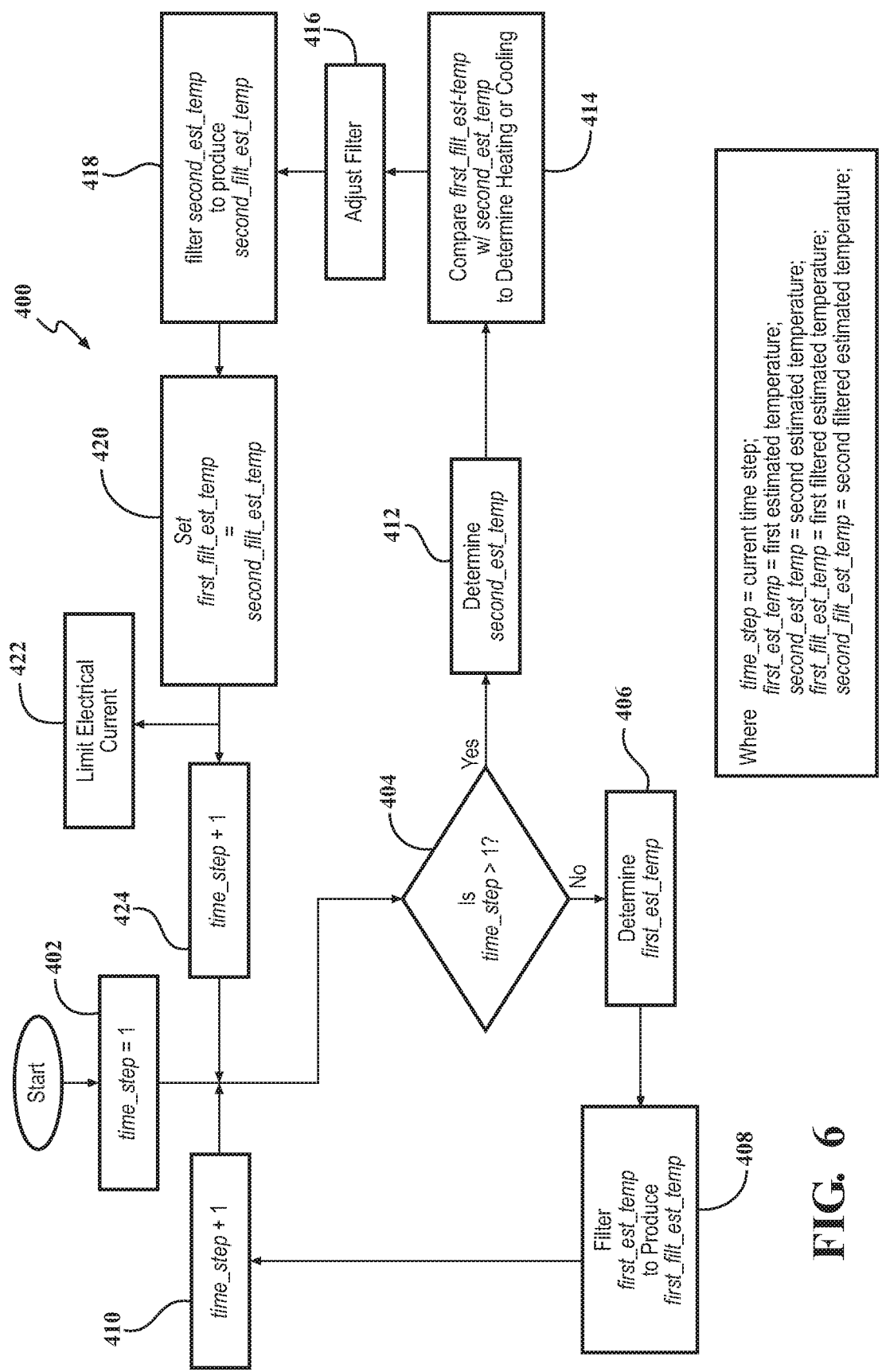
FIG. 6 is a flow chart of a method for limiting electrical current provided to the motor for the electric power steering system, according to one embodiment.

In accordance with the components described above, a method 400 of operating the controller 24 is described herein wherein the steps of the method 400 are illustrated in FIG. 6. At step 402, the controller 24 establishes a first time step. At step 404, the controller 24 assesses whether it is in the first time step or a subsequent time step. At step 406, the controller 24 determines a first estimated temperature of the motor 12 for the first time step. At step 408, the controller 24 filters the first estimated temperature to produce a first filtered estimated temperature of the motor 12. At step 410, the controller 24 increments the time step to a second time step subsequent to the first time step. At step 412, the controller 24 determines a second estimated temperature for the second time step. At step 414, the controller 24 the compares the first filtered estimated temperature with the second estimated temperature to determine whether the motor 12 is heating or cooling. At step 416, the controller 24 adjusts the filter 128 in response to determining whether the motor 12 is heating or cooling. At step 418, the controller 24 filters the second estimated temperature with the filter 128, which has been adjusted, to produce a second filtered estimated temperature of the motor 12. At step 420, the controller 24 sets the first filtered estimated temperature to equal the second filtered estimated temperature in preparation for another cycle of the method 400. At step 422, the controller 24 sets a limit on electrical current provided to the motor 12 using the second filtered estimated temperature. At step 424, the controller 24 again increments the time step to a subsequent time step.

Figure 7:
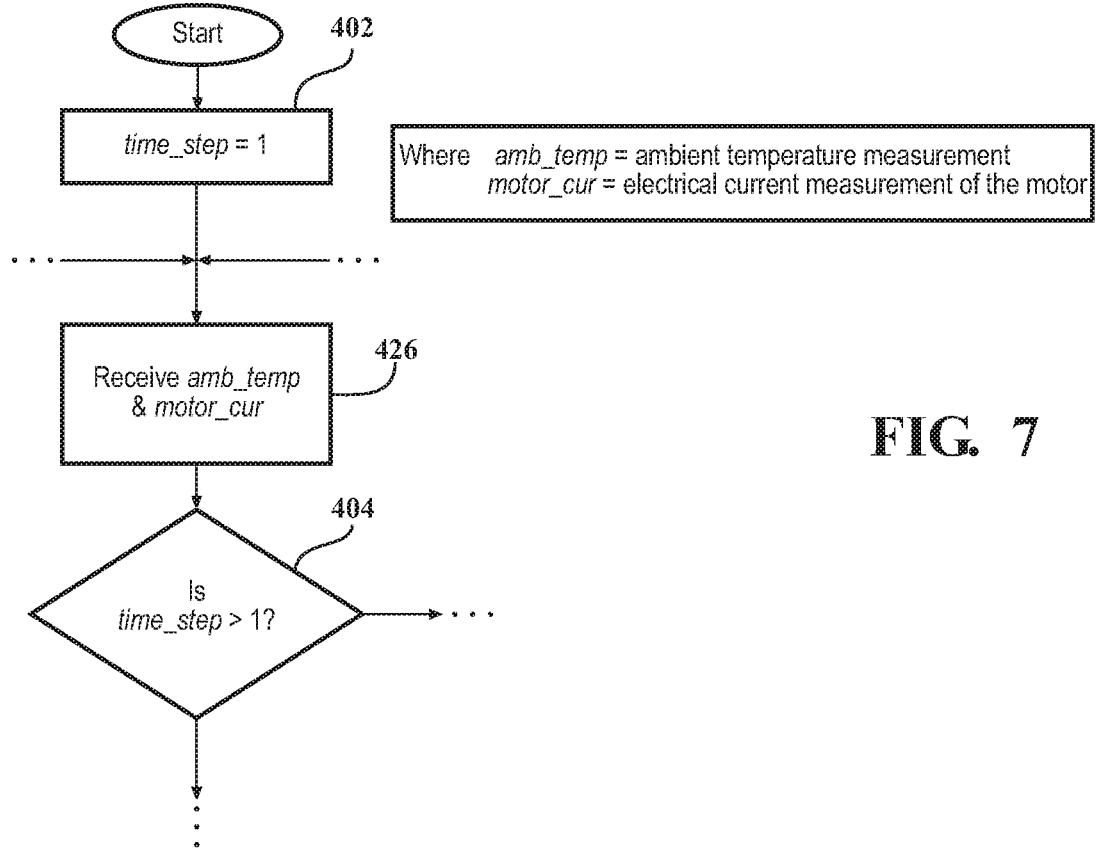
FIG. 7 is a partial view of the flow chart in FIG. 6 wherein a step of receiving an ambient temperature measurement relating to the motor and for receiving an electrical current measurement of the motor has been added, according to one embodiment.

FIG. 7 illustrates a more specific embodiment of the method 400 shown in FIG. 6. In FIG. 7, step 426 has been added between steps 402 and 404. In step 426, the controller 24 receives the ambient temperature measurement relating to the motor 12 as well as the electrical current measurement of the motor 12.

Figure 8:
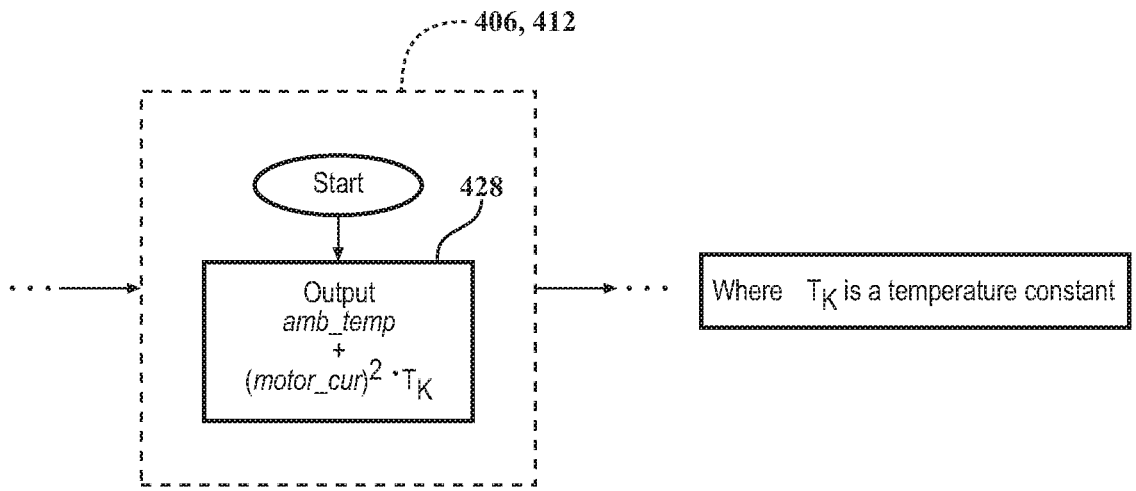
FIG. 8 is a partial view of the flow chart in FIG. 6 wherein a step of determining an estimated temperature of the motor is further detailed, according to one embodiment.

FIG. 8 illustrates a more specific embodiment of the method 400 shown in FIG. 6. In FIG. 8, step 406 and step 412, are further detailed, according to one embodiment. To reiterate, at step 406, the controller 24 determines the first estimated temperature; at step 412, the controller 24 determines the second estimated temperature. In FIG. 8, step 406 and step 412 include step 428. At step 428, the controller 24 plugs the ambient temperature measurement and the electrical current measurement into an equation to determine the first estimated temperature or the second estimated temperature. As shown in FIG. 8, the equation may include a temperature constant, Tk. Tk may be any value suitable for determining an estimated temperature of the motor 12. For example, in one non-limiting embodiment, Tk is set to 0.4° C./A². However, it should be noted that, in other embodiments, Tk may be set to a different suitable value.

Figure 9:
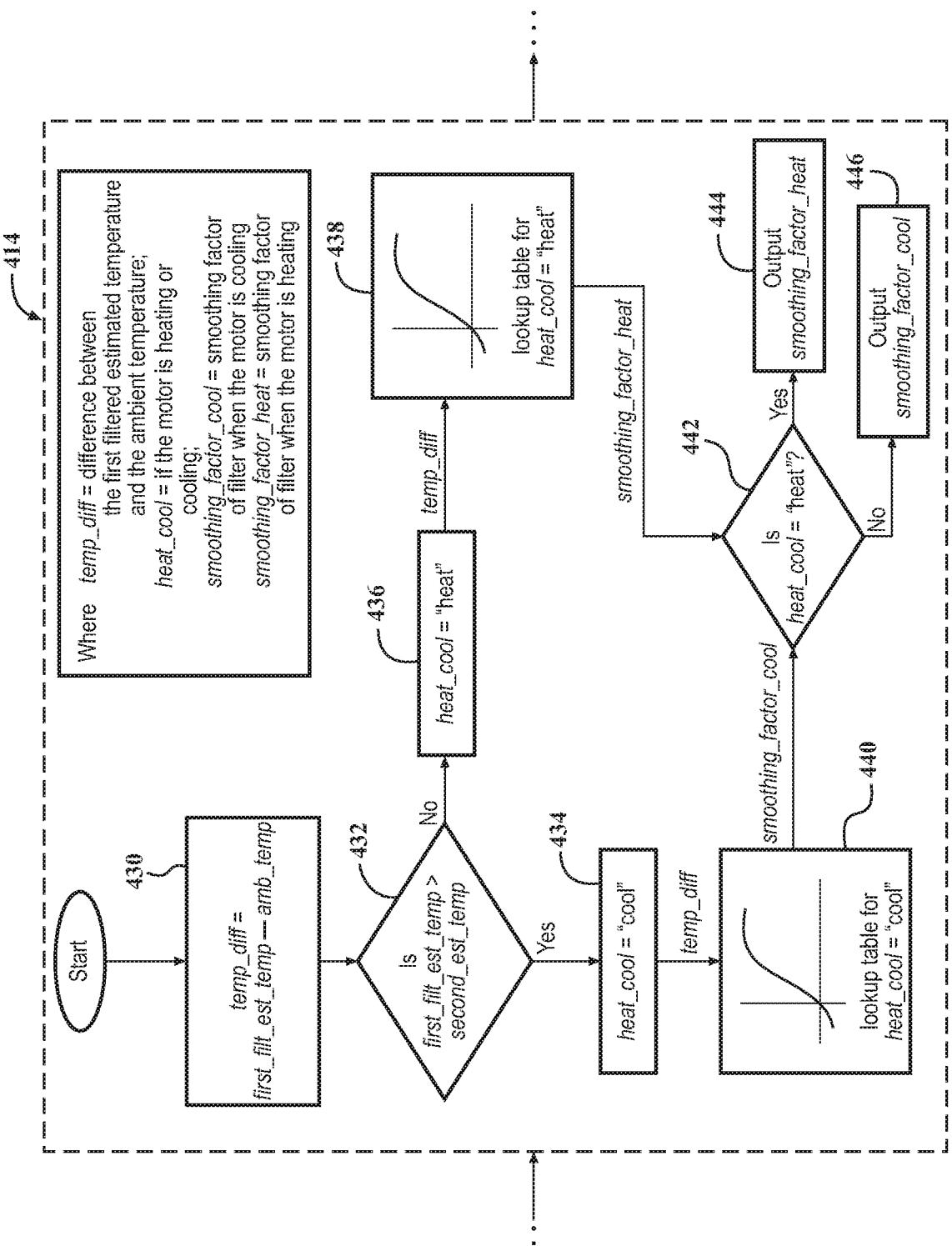
FIG. 9 is a partial view of the flow chart in FIG. 6 wherein a step of comparing a filtered estimated temperature of the motor with an estimated temperature of the motor to determine whether the motor is heating or cooling is further detailed, according to one embodiment.

FIG. 9 illustrates a more specific embodiment of the method 400 shown in FIG. 6. In FIG. 9, step 414 is further detailed, according to one embodiment. To reiterate, at step 414, the controller 24 the compares the first filtered estimated temperature with the second estimated temperature to determine whether the motor 12 is heating or cooling. In FIG. 9, step 414 includes steps 430, 432, 434, 436, 438, 440, 442, 444, and 446. At step 430, the controller 24 determines a difference between the first filtered estimated temperature and the ambient temperature measurement. At step 432, the controller 24 determines whether the first filtered estimated temperature or the second estimated temperature is greater. At step 434 and step 436, the controller 24 determines whether the motor 12 is cooling or heating, respectively. At step 438 and step 440, the controller 24 uses a lookup table to associate a heating smoothing factor or a cooling smoothing factor, respectively, with the difference between the first filtered estimated temperature and the ambient temperature measurement (output by step 430). At step 442, the controller 24 references whether the motor 12 is cooling or heating (output by step 434 or step 436) before proceeding to step 444 or step 446. At steps 444 or 446, the controller 24 outputs the heating smoothing factor or the cooling smoothing factor, respectively.

Figure 10:
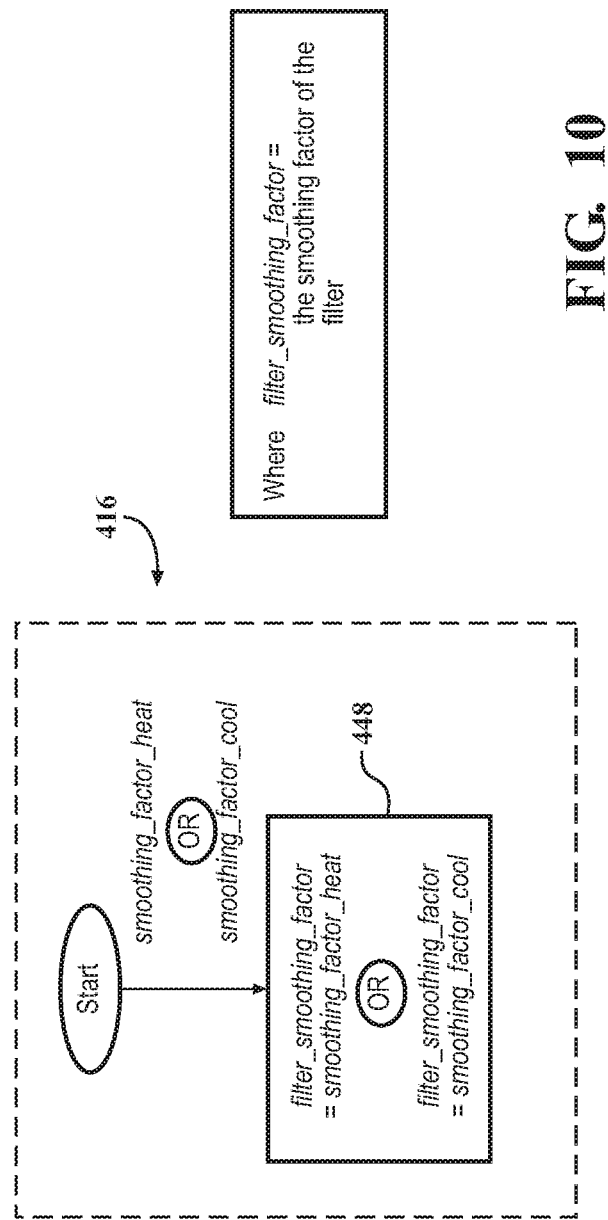
FIG. 10 is a partial view of the flow chart in FIG. 6 wherein a step of adjusting a filter is further detailed, according to one embodiment.

FIG. 10 illustrates a more specific embodiment of the method 400 shown in FIG. 6. In FIG. 10, step 416 is further detailed, according to one embodiment. To reiterate, at step 416, the controller 24 adjusts the filter 128 in response to determining whether the motor 12 is heating or cooling. In FIG. 10, step 416 includes step 448. At step 448, the controller 24 sets a smoothing factor of the filter 128 as either the heating smoothing factor or the cooling smoothing factor, depending on whether the motor 12 is cooling or heating.

Figure 11:
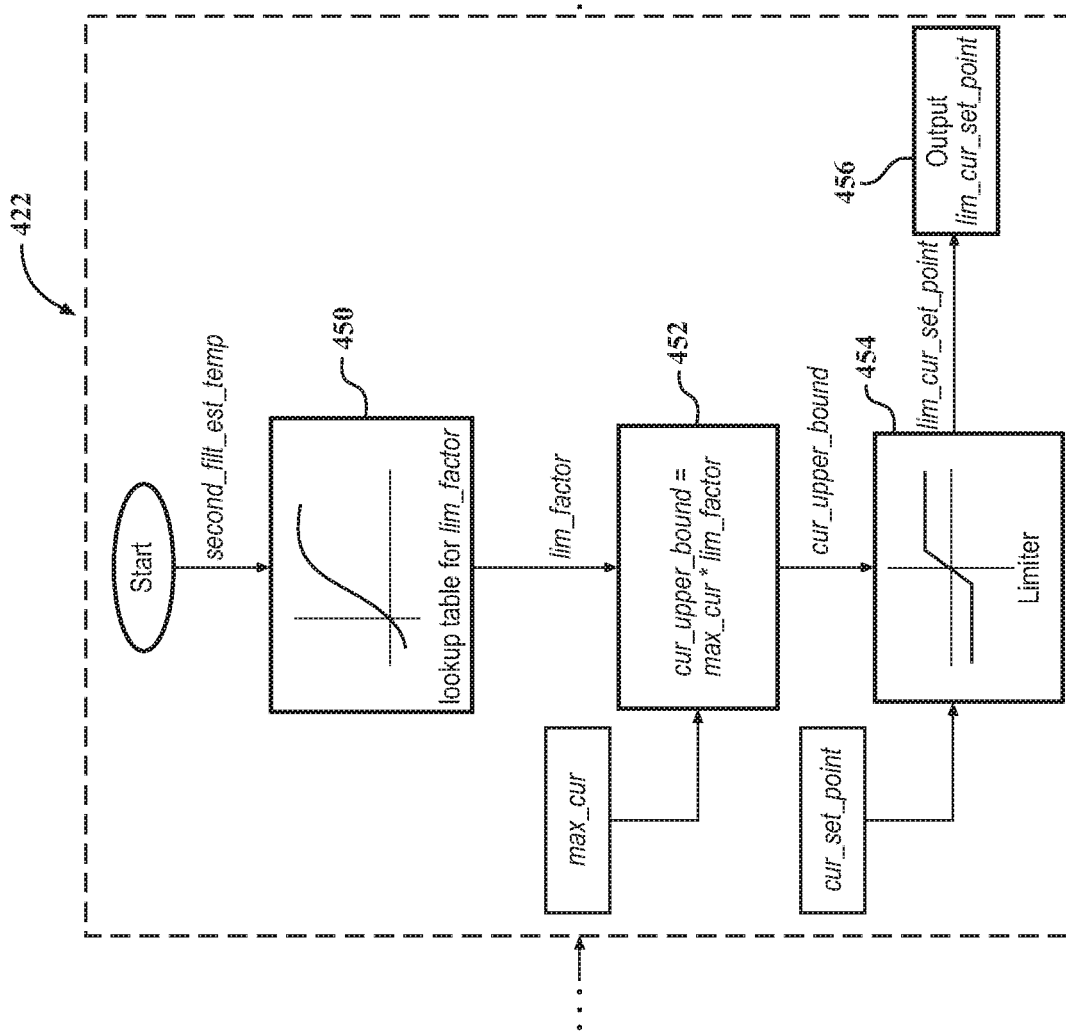
FIG. 11 is a partial view of the flow chart in FIG. 6 wherein a step of setting a limit on electrical current provided to the motor is further detailed, according to one embodiment.

FIG. 11 illustrates a more specific embodiment of the method 400 shown in FIG. 6. In FIG. 11, step 422 is further detailed, according to one embodiment. To reiterate, at step 422, the controller 24 sets a limit on electrical current provided to the motor 12 using the second filtered estimated temperature. In FIG. 11, step 244 includes steps 450, 452, 454, and 456. At step 450, the controller 24 associates the electrical current limiting factor with the second filtered estimated temperature. In other words, the controller 24 determines how to limit the electrical current provided to the motor 12 based on the second filtered estimated temperature. In some embodiments, the controller 24 may not limit the electrical current provided to the motor 12 until the second filtered estimated temperatures reaches a temperature threshold value. In other embodiments, the controller 24 may variably limit the electrical current provided to the motor 12 based on the second filtered estimated temperature. At step 452, an electrical current upper bound is calculated using the preset maximum electrical current allowed to the motor 12 and the electrical current limiting factor. At step 454, the controller 24 limits the electrical current set point to the electrical current upper bound. At step 456, the controller 24 outputs the limited electrical current to the motor 12.

VI. Digital Low-Pass Filter Embodiment

As previously discussed, the filter 128 included in the temperature filtering portion 108 of the controller 24 may be implemented using a variety of filter types. In an embodiment of the controller 24, the filter 128 may be implemented using a digital low-pass filter. In this embodiment, referred to as a digital low-pass filter embodiment, the filter 128 stabilizes estimated temperatures of the motor 12 and adjusts a sensitivity of the filter 128.

To reiterate, the filter 128 filters the estimated temperature of the motor 12 to produce the filtered estimated temperature of the motor 12. To accomplish this task, the filter 128 in the digital low-pass filter embodiment uses an equation:

$$MotorTemp[i]=MotorTemp[i-1]+SF*(MotorTempRaw[i]-MotorTemp[i-1])$$

where i=current time step;
   MotorTemp=the filtered estimated temperature of the motor 12;
   MotorTempRaw=the estimated temperature of the motor 12; and
   SF=the smoothing factor of the filter 128.

It may be noted that, to properly filter a newly estimated temperature of the motor 12, the filter 128 first obtains a previously filtered estimated temperature. Finally, a temperature difference between the new estimated temperature of the motor 12 and the previously filtered estimated temperature of the motor 12 is multiplied by the smoothing factor of the filter 128. Because the smoothing factor of the filter 128 is generally a positive value less than 1, any changes in the new estimated temperature of the motor 12 may be dampened by the filter 128.

Figure 12B:
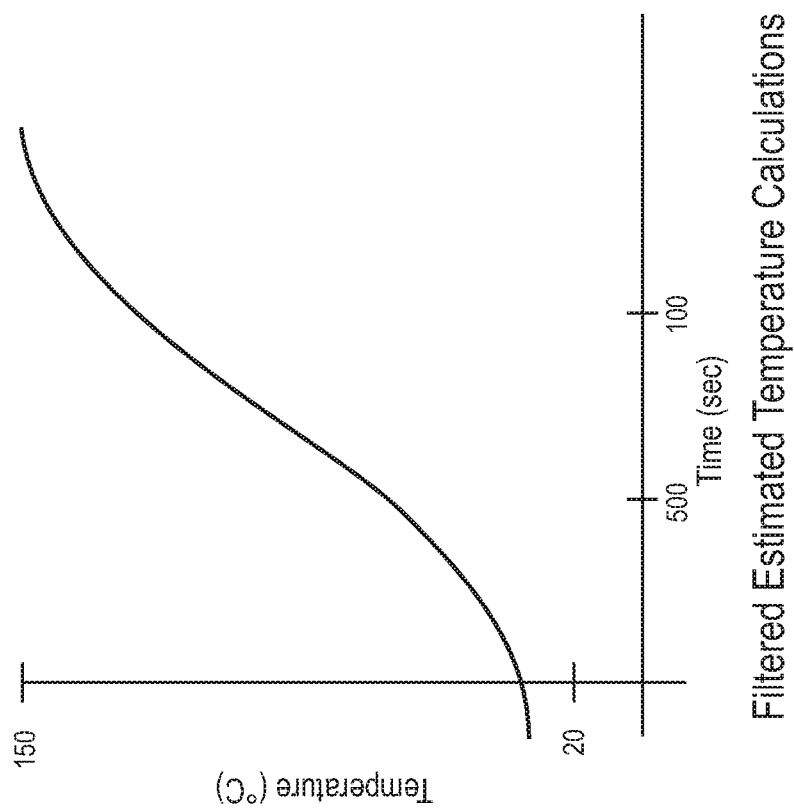
FIGS. 12A and 12B are graphs comparing noisy estimated temperatures and filtered estimated temperatures of the motor, respectively, according to one embodiment.
Figure 12A:
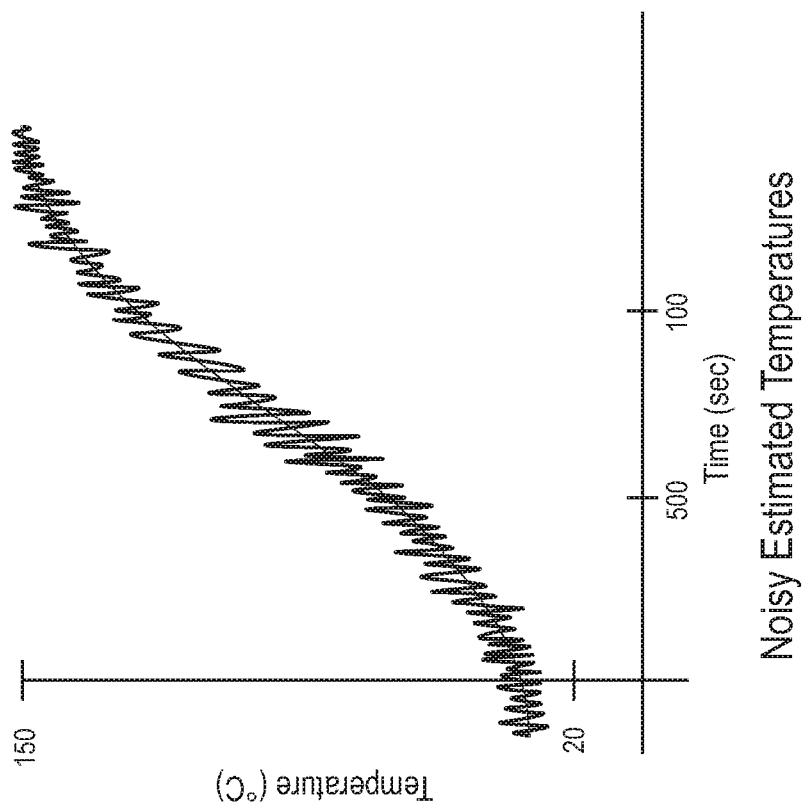

FIGS. 12A and 12B demonstrates how the filter 128 is able to stabilize estimate estimated temperature of the motor 12. FIG. 12A illustrates noisy estimated temperatures of the motor 12 from an embodiment of the electric power steering unit 10 that does not include the filter 128. In contrast, FIG. 12B illustrates the filtered estimated temperatures of the motor 12 from an embodiment of the electric power steering unit 10 that does include the filter 128. Noisy estimated temperatures of the motor 12, as shown in FIG. 12A, may cause the controller 24 to unnecessarily limit the electrical current provided to the motor 12. By filtering the estimated temperatures of the motor 12, the controller 24 is able to provide less noisy temperature readings of the motor 12 and, therefore, provide more stable control of the motor 12.

Furthermore, in the digital low-pass filter embodiment, the smoothing factor of the filter 128 is adjustable. This allows the controller 24 to adjust the sensitivity of the filter 128. Referring back to the equation of the filter 128, it may be noted that the larger the smoothing factor of the filter 128 (in magnitude), the less the new estimated temperature of the motor 12 will be dampened by the filter 128. Conversely, the smaller the smoothing factor of the filter 128 (in magnitude), the more the new estimated temperature of the motor 12 will dampened by the filter 128. In this way, the controller 24 is able to adjust the sensitivity of the filter 128 by adjusting the smoothing factor of the filter 128. An ability to adjust the sensitivity of the filter 128 may be useful when attempting to correctly identify if the controller 24 should limit electrical current provided to the motor 12.

Figure 13:
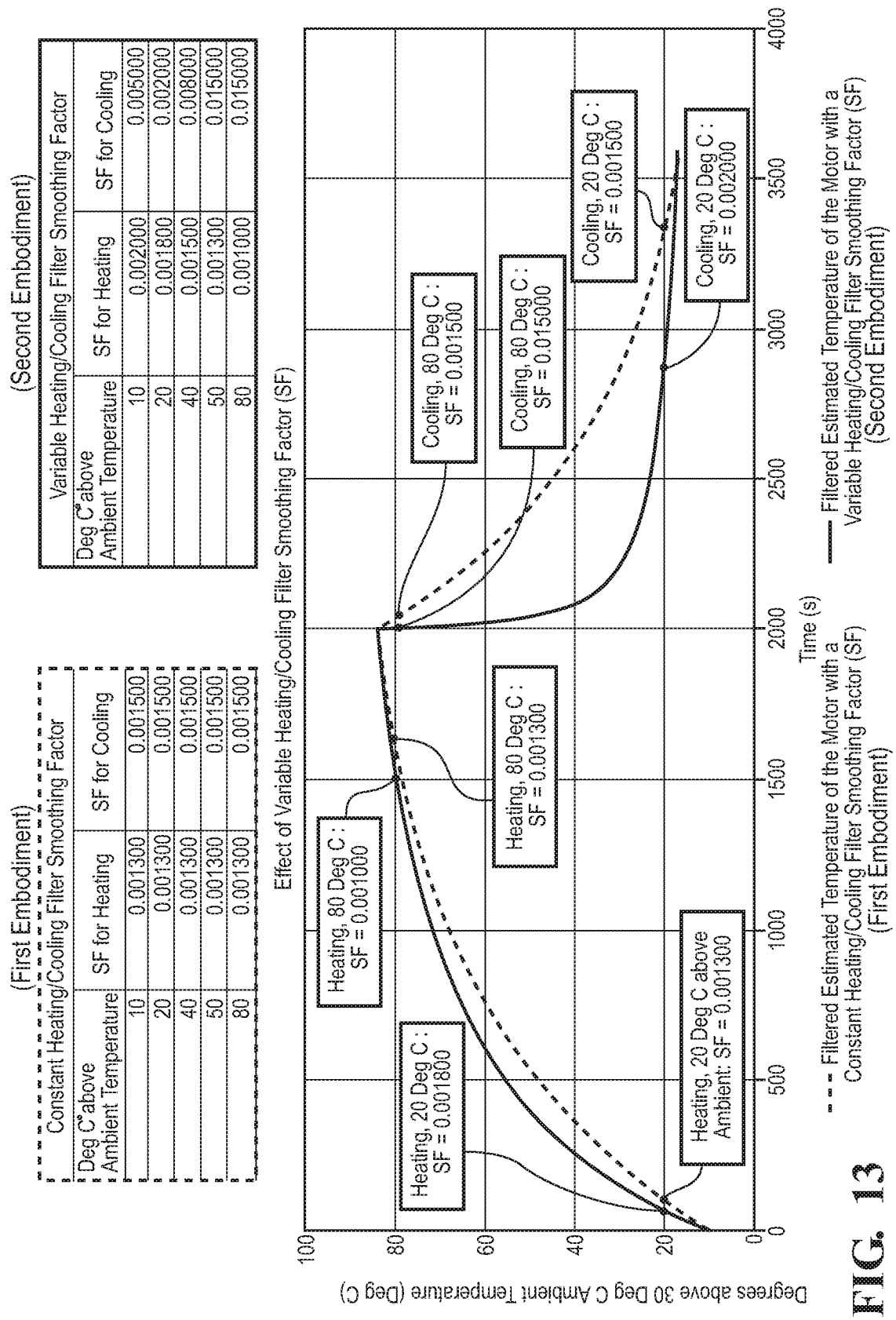
FIG. 13 is a graph illustrating how adjusting the filter affects the filtered estimated temperature of the motor.

FIG. 13 demonstrates how adjusting the sensitivity of the filter 128 affects the filtered estimated temperature of the motor 12. To demonstrate this relationship, FIG. 13 shows results of two simulations of the controller 24 where the simulations coincide with a first and second embodiment of the controller 24. The first embodiment of the controller 24 allows the controller 24 to adjust the smoothing factor of the filter 128 depending on whether the motor 12 is heating or cooling. In other words, in the first embodiment of the controller 24, the filter 128 uses a different smoothing factor if the motor 12 is heating or cooling. The second embodiment of the controller 24 allows the controller 24 to adjust the smoothing factor of the filter 128 depending on whether the motor 12 is heating or cooling and depending on the difference between the filtered estimated temperature of the motor 12 and the ambient temperature measurement relating to the motor 12. In other words, in the second embodiment of the controller 24, the filter 128 uses a different smoothing factor if the motor 12 is heating or cooling and depending on a temperature of the motor 12 when compared to ambient air. FIG. 13 provides time plots of the filtered estimated temperatures of the motor 12 for the first embodiment (dashed line) and the second embodiment (solid line).

It is to be noted that, in both embodiments shown in FIG. 13, the controller 24 limits the electrical current provided to the motor 12 when the difference between the filtered estimated temperature of the motor 12 and the ambient temperature measurement reaches a predetermined temperature threshold level. Furthermore, in both embodiments, the ambient temperature measurement of the motor 12 is permanently set to 30° C. This configuration is purely for purposes of clarity and understanding. In other embodiments of the controller, the ambient temperature measurement may vary during operation of the controller 24 and/or be permanently set to a different temperature value.

Additionally, in FIG. 13, points of interest along the two filtered estimated temperature plots have been identified using labels. Each label shows whether the motor 12 is heating or cooling, a temperature measurement indicating how many degrees the respective filtered estimated temperature is above the ambient temperature measurement, and the smoothing factor of the filter 128.

While examining FIG. 13, it should be noted that the controller 24 in the second embodiment more quickly detects if the motor 12 is heating up and more quickly detects if the motor 12 is cooling down. It may be noted that the smoothing factor of the filter 128 in the first embodiment is larger in magnitude than the smoothing factor of the filter 128 in the second embodiment when the motor 12 is heating and the filtered estimated temperature is 20° C. above the ambient temperature measurement. As such, a more sensitive filter 128 allows the controller 24 to quickly detect if the motor 12 has begun heating up. Similarly, the smoothing factor of the filter 128 in the first embodiment is larger in magnitude than the smoothing factor of the filter 128 in the second embodiment when the motor 12 is cooling and the filtered estimated temperature is 80° C. above the ambient temperature measurement. Therefore, a more sensitive filter 128 allows the controller 24 to quickly detect if the motor 12 is beginning to cool. In this way, the second embodiment of the controller 24 allows for quicker control of the motor 12.

Furthermore, it may be noted that the smoothing factor of the filter 128 in the first embodiment is smaller in magnitude than the smoothing factor of the filter 128 in the second embodiment when the motor 12 is heating and the filtered estimated temperature is 80° C. above the ambient temperature measurement. Here, the controller 24 is preparing to limit electrical current provided to the motor 12. As a result, a less sensitive filter 128 is advantageous as small fluctuations in motor temperature may undesirably cause the filtered estimated temperature to rise above the predetermined temperature threshold level, prompting the controller 24 to unnecessarily limit electrical current provided to the motor 12.

VII. Hot-Start Embodiment

In another embodiment of the controller 24, termed the hot-start embodiment, the controller 24 accounts for situations where an initial temperature of the motor 12 already requires the controller 24 to limit electrical current provided to the motor 12. For example, if the motor 12 is provided a large amount of current for a period of time and then the controller 24 was shut off and reactivated, the motor 12 may be overheating even though the controller 24 may not detect the overheating. To account for these situations, referred to as hot-start situations, the controller 24, upon reactivation, quickly detects the high initial temperature of the motor 12 and limits current provided to the motor 12 to prevent damage to the motor 12.

In a hot-start situation, the high initial temperature of the motor 12 may be much higher than an initial ambient temperature measurement relating to the motor 12. This, unfortunately, creates problems for the controller 24 because the controller 24 may estimate an initial estimated temperature of the motor 12 as a function of ambient temperature measurement. While this is appropriate for situations where the initial temperature of motor 12 is close to the ambient temperature measurement, it is not necessarily appropriate for situations where the initial temperature of the motor 12 is much higher than the ambient temperature measurement. Therefore, it is possible for the initial estimated temperature of the motor 12 to underestimate the high initial temperature of the motor 12.

As a result, the controller 24 introduces a variable, InitialOffset. InitialOffset may be expressed using the following equation:

$$MotorTemp[0]=AmbientTemp[0]+InitialOffset$$

where MotorTemp[0]=initial estimated temperature of the motor 12; and

AmbientTemp[0]=initial ambient temperature measurement relating to the motor 12.

It may be noted from the above equation that InitialOffset is used to provide a more accurate initial estimated temperature of the motor 12 if the initial temperature of the motor 12 is much higher than the initial ambient measurement.

In some embodiments of the controller 24, InitialOffset is a calibrated constant value. In such embodiments, the controller 24 may be configured to limit the electrical current provided to the motor 12 if the filtered estimated temperature reaches a temperature threshold value. Furthermore, it should be noted that, in a hot-start situation, the high temperature of the motor 12 consequentially increases the ambient temperature measurement. This is because, while the ambient temperature itself does not change, the at least one temperature sensors 20, 22 for sensing ambient temperature are located on the motor 12 and may therefore be susceptible to the high temperature of the motor 12. Therefore, to calibrate InitialOffset, the controller 24 first obtains a normal high ambient temperature measurement. InitialOffset is then chosen such that, if one were to add InitialOffset to this ambient temperature measurement, one would yield a temperature measurement just below the temperature threshold value. In this way, if the ambient temperature measurement increases to a temperature value higher than the normal high ambient temperature measurement, which may occur during a hot-start situation, the controller 24 begins limiting electrical current provided to the motor 12.

Referring to the equation previously shown in the digital low-pass filter embodiment of the controller 24, further demonstrates an importance of InitialOffset. In an initial time step after reactivating the controller 24, the filtered estimated temperature of the motor 12 (MotorTemp) will be calculated using the initial estimated temperature of the motor 12 (MotorTemp[0]):

$$MotorTemp[1]=MotorTemp[0]+SF*(MotorTempRaw[1]-MotorTemp[0])$$

If the initial estimated temperature of the motor 12 (MotorTemp[0]) is set to a temperature value indicative of a hot-start situation, the filtered temperature of the motor 12 (MotorTemp[1]) may quickly detect if the motor is overheating. If, on the other hand, MotorTemp[0] is set to a lower value, it may take more time steps for MotorTemp[1] to reflect the hot-start situation.

Figure 14:
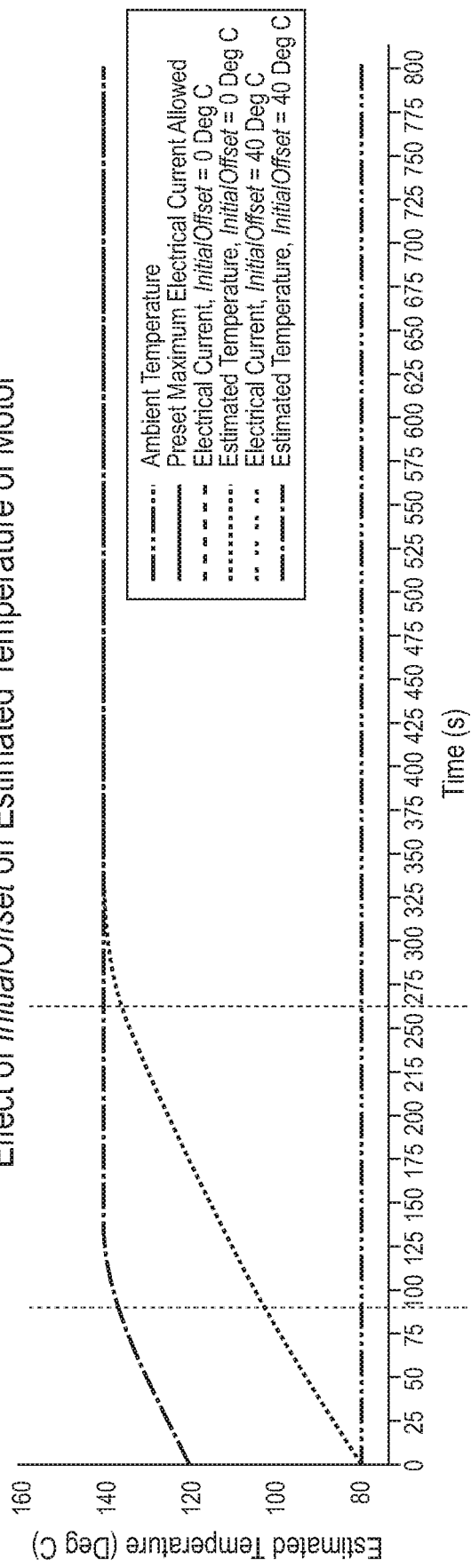
FIG. 14 is a graph illustrating how adjusting an initial temperature of the motor affects an operation of the controller.
Figure 14:
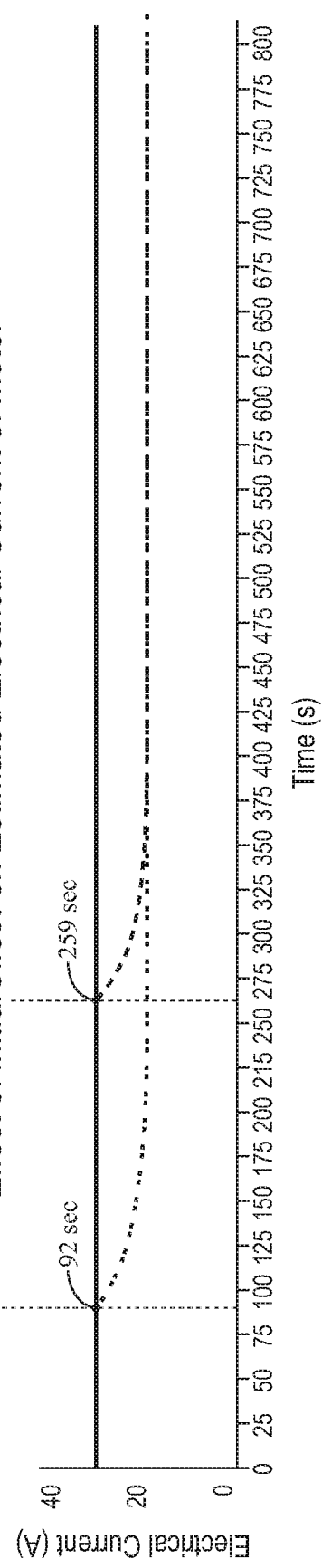

FIG. 14 demonstrates how adjusting InitialOffset affects an operation of the controller 24. To demonstrate this relationship, FIG. 14 shows results of two simulations of the controller 24 where each simulation coincides with a different embodiment of the controller 24. A first embodiment of the controller 24 has an InitialOffset of 0. A second embodiment of the controller 24 has an InitialOffset of 40° C. FIG. 14 provides a time plot of the filtered estimated temperatures of the motor 12 where the filtered estimated temperature of the first and second embodiment of the controller 24 are represented using two dashed lines. FIG. 14 also provides a time plot of electrical current of the motor 12 where the electrical current of the first and second embodiment of the controller 24 are represented using two dashed lines.

In both embodiments illustrated by FIG. 14, the controller 24 receives a high initial temperature of the motor 12. In both embodiments, the controller 24 begins to limit electrical current provided to the motor 12 once the filtered estimated temperatures of the motor 12 reaches 140° C. It may be noted, however, that in the second embodiment, when InitialOffset is set to 40° C., the controller 24 is able to more quickly limit electrical current provided to the motor 12. Looking at the time plot of electrical current, the second embodiment of the controller 24 begins limiting electrical current provided to the motor 12 167 seconds before the first embodiment of the controller 24.

Several embodiments have been discussed the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A controller for limiting electrical current provided to a motor for an electric power steering system, the controller being configured to:
estimate temperatures of the motor over time;
filter the estimated temperatures of the motor using a filter;
adjust the filter in response to changes in the estimated temperatures of the motor over time; and
limit electrical current provided to the motor over time based on the adjusted filter.

2. The controller as set forth in claim 1 being configured to:
receive an ambient temperature measurement relating to the motor from at least one temperature sensor; and
receive an electrical current measurement of the motor from at least one current sensor,
wherein the controller is configured to estimate the temperatures of the motor over time using the ambient temperature measurement relating to the motor and the electrical current measurement of the motor.

3. The controller as set forth in claim 1 being configured to:
determine a first estimated temperature of the motor for a first time step;
filter the first estimated temperature of the motor with the filter to produce a first filtered estimated temperature of the motor;
determine a second estimated temperature of the motor for a second time step subsequent to the first time step;
compare the first filtered estimated temperature of the motor with the second estimated temperature of the motor to determine whether the motor is heating or cooling;
adjust the filter in response to determining whether the motor is heating or cooling;
filter the second estimated temperature of the motor with the adjusted filter to produce a second filtered estimated temperature of the motor; and
set a limit on electrical current provided to the motor using the second filtered estimated temperature of the motor.

4. The controller as set forth in claim 3 being configured to receive an ambient temperature measurement relating to the motor from at least one temperature sensor and to receive an electrical current measurement of the motor from at least one current sensor.

5. The controller as set forth in claim 4 being configured to determine the first estimated temperature of the motor and to determine the second estimated temperature of the motor using the ambient temperature measurement relating to the motor and the electrical current measurement of the motor.

6. The controller as set forth in claim 4 being configured to determine a difference between the first filtered estimated temperature of the motor and the ambient temperature measurement relating to the motor.

7. The controller as set forth in claim 6 being configured to adjust the filter by adjusting a smoothing factor of the filter in response to determining whether the motor is heating or cooling and depending on the difference between the first filtered estimated temperature of the motor and the ambient temperature measurement relating to the motor.

8. The controller as set forth in claim 3 being configured to filter the first estimated temperature of the motor and to filter the second estimated temperature of the motor using a low-pass filter.

9. The controller as set forth in claim 3 being configured to:
input the second filtered estimated temperature of the motor into an electrical current limiting factor lookup table;
determine an electrical current limiting factor using the electrical current limiting factor lookup table; and
set the limit on electrical current provided to the motor by applying the electrical current limiting factor to a preset maximum electrical current allowed to the motor.

10. A method for limiting electrical current provided to a motor for an electric power steering system, said method comprising the steps of:
estimating temperatures of the motor over time;
filtering the estimated temperatures of the motor using a filter;
adjusting the filter in response to changes in the estimated temperatures of the motor over time; and
limiting electrical current provided to the motor over time based on the adjusted filter.

11. The method as set forth in claim 10 further comprising the steps of:
determining a first estimated temperature of the motor for a first time step;
filtering the first estimated temperature of the motor with the filter to produce a first filtered estimated temperature of the motor;
determining a second estimated temperature of the motor for a second time step subsequent to the first time step;
comparing the first filtered estimated temperature of the motor with the second estimated temperature of the motor to determine whether the motor is heating or cooling;
adjusting the filter in response to determining whether the motor is heating or cooling;
filtering the second estimated temperature of the motor with the adjusted filter to produce a second filtered estimated temperature of the motor; and
setting a limit on electrical current provided to the motor using the second filtered estimated temperature of the motor.

12. The method as set forth in claim 11 further comprising a step of receiving an ambient temperature measurement relating to the motor from at least one temperature sensor and a step of receiving an electrical current measurement of the motor from at least one current sensor.

13. The method as set forth in claim 12 wherein the step of determining the first estimated temperature of the motor and the step of determining the second estimated temperature of the motor further comprises a step of using the ambient temperature measurement relating to the motor and the electrical current measurement of the motor.

14. The method as set forth in claim 12 further comprising a step of determining a difference between the first filtered estimated temperature of the motor and the ambient temperature measurement relating to the motor.

15. The method as set forth in claim 14 wherein the step of adjusting the filter comprises a step of adjusting a smoothing factor of the filter in response to determining whether the motor is heating or cooling and depending on the difference between the first filtered estimated temperature of the motor and the ambient temperature measurement relating to the motor.

16. The method as set forth in claim 11 wherein the step of filtering the first estimated temperature of the motor and the step of filtering the second estimated temperature of the motor further comprises a step of using a low-pass filter.

17. The method as set forth in claim 11 wherein the step of setting the limit on electrical current further comprises the steps of:
inputting the second filtered estimated temperature of the motor into an electrical current limiting factor lookup table;
determining an electrical current limiting factor using the electrical current limiting factor lookup table; and
setting the limit on electrical current provided to the motor by applying the electrical current limiting factor to a preset maximum electrical current allowed to the motor.

18. A controller for limiting electrical current provided to a motor for an electric power steering system, said controller comprising:
a motor temperature estimating portion comprising:
a first input configured to receive an ambient temperature measurement relating to the motor;
a second input configured to receive an electrical current measurement of the motor;
a first combiner coupled to the first input and the second input and configured to combine the ambient temperature measurement relating to the motor and the electrical current measurement of the motor for determining an estimated temperature of the motor;
a temperature filtering portion comprising a filter coupled to the first combiner and the first input and configured to receive and to filter the estimated temperature of the motor; and
a first output coupled to the temperature filtering portion and configured to output a filtered estimated temperature of the motor; and
a motor current control portion coupled to the motor temperature estimating portion and configured to limit electrical current provided to the motor in response to the filtered estimated temperature of the motor.

19. The controller as set forth in claim 18 wherein the motor current control portion comprises:
a third input coupled to the first output and configured to receive the filtered estimated temperature of the motor;
a fourth input configured to receive an electrical current set point for controlling the motor;
a first memory coupled to the third input and configured to associate the filtered estimated temperature of the motor with an electrical current limiting factor;
a second memory configured to store a preset maximum electrical current allowed to the motor;
a second combiner coupled to the first memory and the second memory and configured to apply the electrical current limiting factor to the preset maximum electrical current allowed to the motor;

a limiter coupled to the fourth input and the second combiner and configured to limit the electrical current set point for controlling the motor using an output of the second combiner; and a second output coupled to the limiter and configured to provide the limited electrical current set point for controlling the motor.

20. The controller as set forth in claim 18 wherein the temperature filtering portion comprises:

a third combiner coupled to the first input and the first output and configured to combine the ambient temperature measurement relating to the motor and the filtered estimated temperature of the motor;

a third and fourth memory each coupled to the third combiner and configured to associate a smoothing factor of the filter with an output of the third combiner;

a comparator coupled to the first combiner and the first output and configured to compare the filtered estimated temperature of the motor and the estimated temperature of the motor to determine if the motor is heating or cooling; and a switch coupled to the comparator and the third and fourth memory and configured to output the smoothing factor of the filter in response to determining whether the motor is heating or cooling, wherein the filter is coupled to the first combiner and the switch and outputs to the first output.

* * * * *